US011322838B1

(12) United States Patent
Ramachandran et al.

(10) Patent No.: US 11,322,838 B1
(45) Date of Patent: May 3, 2022

(54) TECHNIQUES FOR IN-ORBIT CALIBRATION OF PHASED ARRAY ANTENNA

(71) Applicant: Amazon Technologies, Inc., Seattle, WA (US)

(72) Inventors: Iyappan Ramachandran, Sammamish, WA (US); Simon Jacques Damphousse, Bellevue, WA (US); Tara Yousefi, Bellevue, WA (US); Billy Pingli Kao, Bothell, WA (US); Murat Veysoglu, Kirkland, WA (US); Ming-Chun Paul Lee, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/866,239

(22) Filed: May 4, 2020

(51) Int. Cl.
| | |
|---|---|
| *H04B 1/60* | (2006.01) |
| *H01Q 3/26* | (2006.01) |
| *H04B 17/13* | (2015.01) |
| *H01Q 21/22* | (2006.01) |
| *H04B 7/185* | (2006.01) |
| *H04B 17/12* | (2015.01) |

(52) U.S. Cl.
CPC ............ *H01Q 3/267* (2013.01); *H01Q 21/22* (2013.01); *H04B 7/1858* (2013.01); *H04B 17/12* (2015.01); *H04B 17/13* (2015.01)

(58) Field of Classification Search
CPC ........ H01Q 3/267; H01Q 21/22; H04B 17/11; H04B 17/12; H04B 17/13; H04B 17/21; H04B 7/1858; G01S 7/40; G01S 7/497; G01S 19/23; G01S 19/235
USPC ............................................................ 455/9
See application file for complete search history.

(56) References Cited

U.S. PATENT DOCUMENTS

| | | | | |
|---|---|---|---|---|
| 5,572,219 | A * | 11/1996 | Silverstein ............. | H01Q 3/005 342/165 |
| 9,705,611 | B1 * | 7/2017 | West ...................... | H04B 17/21 |
| 9,979,084 | B2 * | 5/2018 | Sikina ................... | H04B 17/12 |
| 10,670,711 | B2 * | 6/2020 | Devaraj .................. | G01S 7/03 |
| 2004/0127260 | A1 * | 7/2004 | Boros ............... | H04L 25/03343 455/562.1 |
| 2010/0164782 | A1 * | 7/2010 | Saha .................. | H04B 7/18519 342/174 |
| 2012/0269245 | A1 * | 10/2012 | Mehrmanesh ......... | H04B 17/20 375/224 |
| 2015/0349419 | A1 * | 12/2015 | Frink ..................... | H01Q 3/267 342/371 |

(Continued)

*Primary Examiner* — April G Gonzales
(74) *Attorney, Agent, or Firm* — Lowenstein Sandler LLP

(57) ABSTRACT

Technologies directed to calibrating phased array antennas are described. A processing device of a communication device causes a first radio to send a first signal via a first antenna element. The first signal has a set of tones. Each tone of the set of tones has a frequency within a fixed frequency range. The processing device causes a second radio to receive a second signal via a second antenna element. The second signal is a response to the first signal. The processing device determines that there is a difference between the second signal and a reference signal. The processing device adjusts at least one of a phase parameter value, a gain parameter value, or a time-delay parameter value of a radio frequency component based on the difference.

20 Claims, 8 Drawing Sheets

(56) References Cited

U.S. PATENT DOCUMENTS

2018/0034541 A1\* 2/2018 Chen .............. H04B 17/21
2019/0101640 A1\* 4/2019 Devaraj ........... H01Q 21/29

\* cited by examiner

US 11,322,838 B1

TECHNIQUES FOR IN-ORBIT CALIBRATION OF PHASED ARRAY ANTENNA

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
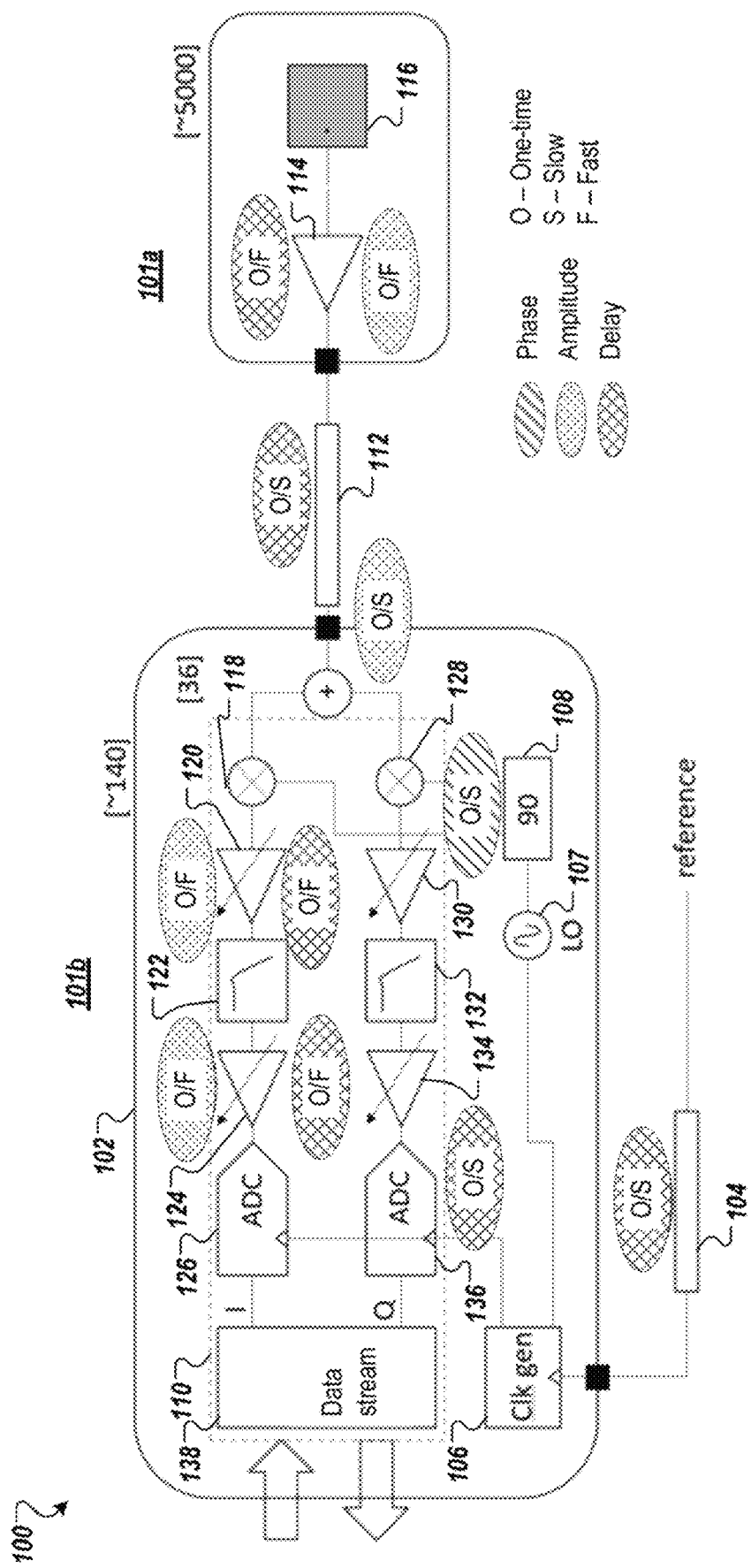
FIG. 1 is a schematic diagram of a receiver chain associated with each antenna element of a phased array antenna according to one embodiment.

Technologies directed to calibrating phased array antennas are described. Conventionally, wireless devices that have phased array antennas need to be calibrated to correct for manufacturing errors and process variations in the manufacturing. The phased array antenna synthesizes a specified electric field (phase and amplitude) across an aperture and the elements are spaced apart with a specified inter-element spacing value (e.g., a distance between any two elements of the phased array antenna). Phased array antennas operate by manipulating the phase of a signal that is transmitted or received by each antenna element such that the signals from each of the antenna elements are in-phase for a desired beam scanning angle. If the signal is broadband in nature, a manipulation of signal delays may be required instead of or in addition to a manipulation in phase in order to ensure that the entire bandwidth is scanned to the same angle. Signal amplitudes can be separately manipulated to shape the beam pattern as required. Each antenna element and the associated signal path can have a different amplitude, phase, and time delay relative to the other antenna elements. In order for the phased array antenna to perform beam forming, relative differences need to be accurately characterized and compensated. Relative differences can be caused by inherent offsets due to manufacturing, variations over frequencies and temperatures, gradual drifts over time, rapidly fluctuation conditions, and the like. Relative differences in amplitude and phase offsets can vary considerably over various frequencies and temperatures, which means that characterization is required over multiple frequencies and temperatures. Additionally, some offsets can gradually drift over time and/or rapidly fluctuation over temperature, voltage, and load conditions. Each of these offsets requires regular corrections. Inter-element calibrations affect beam forming and require characterizing and compensating for relative offsets over the entire phase antenna array and can be referred to as panel-level calibration. A phased array antenna can be implemented on a satellite that is deployed and in operation, and thus calibration needs to be done both initially and as an ongoing process once the satellite is in orbit. When a satellite is in orbit, calibration can suffer from an accuracy and speed trade-off.

Aspects of the present disclosure overcome the deficiencies of conventional calibration techniques by employing embedded calibration probes within the phased array antenna for in-orbit calibration. One apparatus includes a phased array antenna including a set of antenna elements, a probe element located on the surface of a support structure and adjacent to some of the set of antenna elements, a first radio with at least one radio frequency (RF) component, and a second radio coupled to the probe element. The set of antenna elements, the probe element, and the first radio are disposed on a surface of a support structure. The RF component has at least one of a phase parameter value, a gain parameter value, or a time-delay parameter value that are adjustable for calibrating at least one of a phase, a gain, or a time-delay of a signal path between the first radio and at least one of the set of antenna elements. The second radio generates and sends a first signal via the probe element. The first signal includes a multi-tone waveform (e.g., a waveform that exists over multiple frequencies) including a set of tones and covering a fixed bandwidth. It should be noted that a signal can refer generically to an electromagnetic wave or electromagnetic radiation that can be transmitted or received while a waveform of a signal can refer to a frequency response of the signal. Additionally or alternatively, a waveform of a signal can refer to a frequency response, a relative-amplitude profile, a frequency profile, or the like. Each tone occupies a certain non-overlapping frequency range within the fixed bandwidth. The first radio receives a second signal which is received in response to the first signal being sent by the second radio. A second waveform of the second signal can be measured and compared to a reference waveform. The second waveform represents a frequency response of the second signal. Similarly, the reference waveform represents a frequency response of a reference signal. At least one of the phase parameter value, the gain parameter value, or the time-delay parameter value can be adjusted based on determining that there is a difference between the second waveform and the reference waveform.

The apparatus can include a set of probe elements located on the surface of a support structure and adjacent to some of the set of antenna elements, and a number of probe elements of the set of probe elements is less than a number of antenna elements of the set of antenna elements. The power of the signal transmitted by each probe is typically such that the nearest antenna elements are not saturated while the farthest antenna elements receive a sufficient signal power. The difference between the two power levels is referred to as the dynamic range.

Aspects of the present disclosure can overcome conventional calibration speed and accuracy tradeoffs by distinguishing between two kinds of offsets that require calibration. The first type includes static offsets that can arise from geometric and electrical irregularities that, in turn, are caused by finite manufacturing tolerances, process variations, trace lengths, and the like. These types of offsets can be handled by a one-time calibration process that occurs in-factory and before a satellite is deployed. The second type includes dynamic offset changes that can be caused by changes in temperature, voltage, load, and the like, as well as by aging of the system. Dynamic offset changes require in-orbit corrections.

Aspects of the present disclosure can overcome conventional calibration speed and accuracy tradeoffs by further distinguishing between the two kinds of dynamic offset changes. Dynamic offsets changes can be corrected using open-loop calibrations or closed-loop calibrations. Open-loop calibrations can be applied when required corrections can be pre-characterized. Open-loop calibrations can be applied when dependencies of various components on changes (such as in temperature or voltage) can be pre-characterized. Such dependencies should be pre-characterized because the changes happen on a fast timescale. Open-loop calibrations can be applied even when a satellite is actively transmitting or receiving a signal. As such, an open-loop calibration can be referred to as a fast calibration. In some cases, open-loop calibrations can be applied even when one or more antenna elements of a phased array antenna are actively transmitting or receiving a signal. In some cases, open-loop calibrations can be performed on dynamic changes that occur on a timescale that is less than the time a satellite takes to complete approximately one orbit. Closed-loop calibrations need to be applied when changes, such as those caused by aging and element failures, need to be directly measured in order to attempt to return them to a known calibrated state. In some cases, a known calibrated state can be pre-stored as a reference state, or a golden reference state. The known calibrated state can be obtained by performing the process of a closed-loop calibration immediately after the one-time calibration process that occurs in-factory. Closed-loop calibrations can only be performed when antenna elements of a phased array antenna are idle. As such, closed-loop calibrations can also be referred to as slow calibrations. In some cases, closed-loop calibrations can only be performed when a satellite is not actively transmitting or receiving a signal. In some cases, closed-loop calibrations can be performed on dynamic changes that occur on a timescale that is greater than the time a satellite takes to complete approximately one orbit. By performing each stage of calibration, a phased array antenna can more efficiently perform beamforming to transmit or receive signal as a directed beam of electromagnetic radiation. In some cases, some dynamic changes, such as those that depend on load conditions can vary so rapidly that correcting them can be difficult. Such changes can be properly managed and kept within an acceptable range. Table 1 below indicates the type of calibration to be used for various types of parameters.

TABLE 1

| Quantities | One-time factory | Open-loop in-orbit | Closed-loop in-orbit | No calibration |
|---|---|---|---|---|
| Static | ✓ | | | |
| Slow dynamic | | | ✓ | |
| Fast dynamic | | ✓ | | |
| Rapid dynamic | | | | ✓ |

FIG. 1 is a schematic diagram of radio frequency front-end (RFFE) circuitry 100 with multiple receiver (RX) chains 110 each RX chain being coupled to an antenna element of a phased array antenna according to one embodiment. In general, a chain or RF chain is a set of electronic components (e.g., may include amplifiers, filters, mixers, attenuators, detectors, or the like) that are cascaded between an antenna element and a processing device, such as a baseband processor, and that are used for signal processing wireless signals. A RX chain is a set of electronic components that receive and process incoming RF signals received at an antenna element coupled to the RX chain. A RX chain can also be referred to as a receiver, whereas a transmitter (TX) chain can be referred to as a transmitter. RX and TX chains can be used as part of a Multiple-Input, Multiple-Output (MIMO) radio or part of a set of multiple radios. Of course, in some embodiments, the RX chain 110 can be part of a transceiver that also includes a TX chain. The RFFE circuitry 100 can include multiple RX chains 110 for a phased array antenna, which can include many antenna elements, such as illustrated with approximately 5000 antenna elements. For the 5000 antenna elements, 36 RX chains 110 can operate in a first RFFE circuit 102, which includes a clock generator 106, a local oscillator 107, and a phase shifter 108. The first RFFE circuit 102 can be replicated 140 times in order to couple each RX chain 110 to one of the 5000 antenna elements. The antenna elements can be disposed on a first surface 101a of a support structure 101 and the RX chain 110 can be disposed on a second surface 101b of the support structure 101. Alternatively, the RFFE circuitry 100 can be disposed on the same surface as the antenna elements. The support structure 101 can be a circuit board, such as a printed circuit board (PCB) or other structure upon which the RX chain(s) 110 can be positioned.

The first RFFE circuit 102 can include a reference signal that is input via a reference line 104 to the clock generator 106. A local oscillator 107 is coupled to the clock generator 106 and the phase shifter 108. The local oscillator 107 provides a timing signal. As noted above, the first RFFE circuit 102 includes thirty-six instances of the RX chain 110 for each clock generator 106 and the phase shifter 108. The first RFFE circuit 102 can include some external components that are separate from the circuit board, such as an amplifier 114 that is located in closer proximity to an antenna element 116. In this case, a pin of the first RFFE circuit 102 is coupled to a transmission line 112 that is coupled to the amplifier 114.

In a first signal path of the RX chain 110, such as the in-phase signal path (e.g., for I samples) a mixer 118 is coupled to the transmission line 112. The mixer 118 can be coupled to variable gain amplifier (VGA) 120. The VGA 120 can be coupled to a filter 122. The filter 122 can be coupled to a VGA 124. The VGA 124 can be coupled to an analogto-digital converter (ADC) 126. The ADC 126 can be coupled to data stream circuitry 138. The data stream circuitry 138 can include a buffer to store the I samples from the ADC 126. In a second signal path of the RX chain 110, such as the quadrature signal path (e.g., for Q samples), a mixer 128 is coupled to the transmission line 112. The mixer 128 can be coupled to a VGA 130. The VGA 130 can be coupled to a filter 132. The filter 132 can be coupled to a VGA 134. The VGA 134 can be coupled to an ADC 136. An output of the ADC 126 can be coupled to data stream circuitry 138. The data stream circuitry 138 can include the same buffer or a separate buffer to store the Q samples from the ADC 136.

A one-time calibration of the phased array antenna requires a calibration of each RX chain 110. Calibration of an RX chain 110 can involve determining and compensating for static geometric uncertainties and electrical uncertainties than can arise due to manufacturing tolerances and process variations. For example, each of the amplifiers 114, 120, 124, 130, and 134, the transmission line 112, the ADCs 126 and 136, the reference line 104, the phase shifter 108, and the RFFE 102 can undergo a one-time calibration, as described further with respect to FIGS. 2-3. More specifically, the phase shifter 108 can undergo a one-time phase calibration to adjust a phase parameter value. The amplifiers 114, 120, 124, 130, and 134 and the RFFE 102 can undergo a one-time amplitude gain calibration to adjust a gain parameter value. The amplifiers 114, 120, 124, 130, and 134, the ADCs 126 and 136, the transmission line 112, and the reference line 104 can undergo a one-time calibration to calibrate a time-delay parameter value. It should be noted that no quantity is entirely static and each will experience at least some amount of dynamic change.

In addition to a one-time calibration, each of the above-mentioned components can require further calibrations due to dynamic changes, such as due to temperature changes, voltage changes, load changes, aging, and the like. Dynamic changes can arise due to temperature and voltage variations, aging, element failures, and the like. Dynamic changes can be handled by periodic in-orbit calibrations. In-orbit calibrations can be open-loop calibrations or closed-loop calibrations. Open-loop calibrations can be applied when required corrections can be pre-characterized and can be applied even when the RX chain 110 is actively receiving a signal. Closed-loop calibrations need to be applied when changes need to be directly measured in order to attempt calibration, and can only be applied when the RX chain 110 is idle (e.g., not actively receiving a signal). In-orbit calibrations are discussed in further detail with respect to FIG. 4.

In orbit, the RX chain 110 can receive a signal via the antenna element 116. The signal is amplified by the amplifier 114. The amplifier 114 can undergo a fast amplitude gain calibration as well as a fast time-delay calibration. The amplifier 114 can be affected by changes or fluctuations in temperature and voltage, in addition to combined load characteristics of each RX chain, which can vary rapidly. The signal can then be passed through the transmission line 112. When the RX chain 100 is not actively receiving a signal, the transmission line 112 can undergo a slow time-delay calibration. The signal can then be split and passed through the in-phase signal path and the quadrature signal path. In the in-phase signal path, the signal can be mixed with a timing signal from the clock generator 106. The clock generator 106 receives a reference signal through the reference line 104. When the RX chain 110 is not actively receiving a signal, the reference line 104 can undergo a slow time-delay calibration. The signal can be passed through the amplifier 120, the filter 122, and the VGA 124. The VGAs 120 and 124 can undergo a fast amplitude gain calibration and a fast time-delay calibration. The signal can then be digitized by the ADC 126. When the RX chain 110 is not actively receiving a signal, the ADC 126 can undergo a slow time-delay calibration. The in-phase signal can then be stored by the data stream circuitry 138. In the quadrature signal path, the signal can be mixed with a 90 degree phase-shifted timing signal from the clock generator 106. When the RX chain 110 is not actively receiving a signal, the phase shifter 108 can undergo a slow phase calibration. The signal can be passed through the amplifier 130, the filter 132, and the VGA 134. The VGAs 130 and 134 can undergo a fast amplitude gain calibration and a fast time-delay calibration. The signal can then be digitized by the ADC 136. When the RX chain 110 is not actively receiving a signal, the ADC 136 can undergo a slow time-delay calibration. The quadrature signal can then be stored by the data stream circuitry 138. The slow time-delay calibrations can result from aging of the RFFE circuit 102, which can in some cases result in expansion or compression of signal lines, such as the transmission line 112, the reference line 104, and the like. In some embodiments, the VGAs 120, 124, 130, and 134 can be designed such that their gain settings have minimal impact on their phase and group delay characteristics. In such a case, performing a calibration at a single gain setting can be sufficient to extrapolate to other gain settings. In other embodiments, the calibration of VGAs 120, 124, 130, and 134 should be performed at more than one gain settings.

In one embodiment, the amplifier 114 is a low noise amplifier. In other embodiments, the amplifier 114 can be a variable gain amplifier, an RF amplifier, or other type of amplifier. Though depicted in FIG. 1 as VGAs, the VGAs 120, 124, 130, and 134 can alternatively be low noise amplifiers, RF amplifiers, or the like.

It should be noted that since beam forming is an entirely digital operation involving no analog phase shifters or attenuators, it may not be necessary to calibrate each receiver chain for every phase and amplitude gain setting of the beam former.

It should also be noted that the architecture of the RFFE circuitry 100 in FIG. 1 is a zero intermediate frequency (ZIF) type architecture that uses mixers to down-convert the RF signals from radio frequencies to lower intermediate frequencies for further processing. In other embodiments, the RFFE circuitry 100 can include other combinations of components, such as an architecture without mixers. The RFFE circuitry 100 also has in-phase and quadrature signals paths, whereas other embodiments, may not have two signal paths. In these cases, the RFFE circuitry 100 may not include the phase shifter 108.

As illustrated in FIG. 1, there are various parameters values that can be calibrated according to the various types of calibrations described herein. The oval labels indicate whether the parameter values are calibrated one-time in the factory and subsequently calibrated during fast calibration or slow calibration. The oval labels also indicate the particular parameter value that can be adjusted at a particular component, such as a phase parameter value, a gain parameter value, or a time-delay parameter value.

Figure 2:
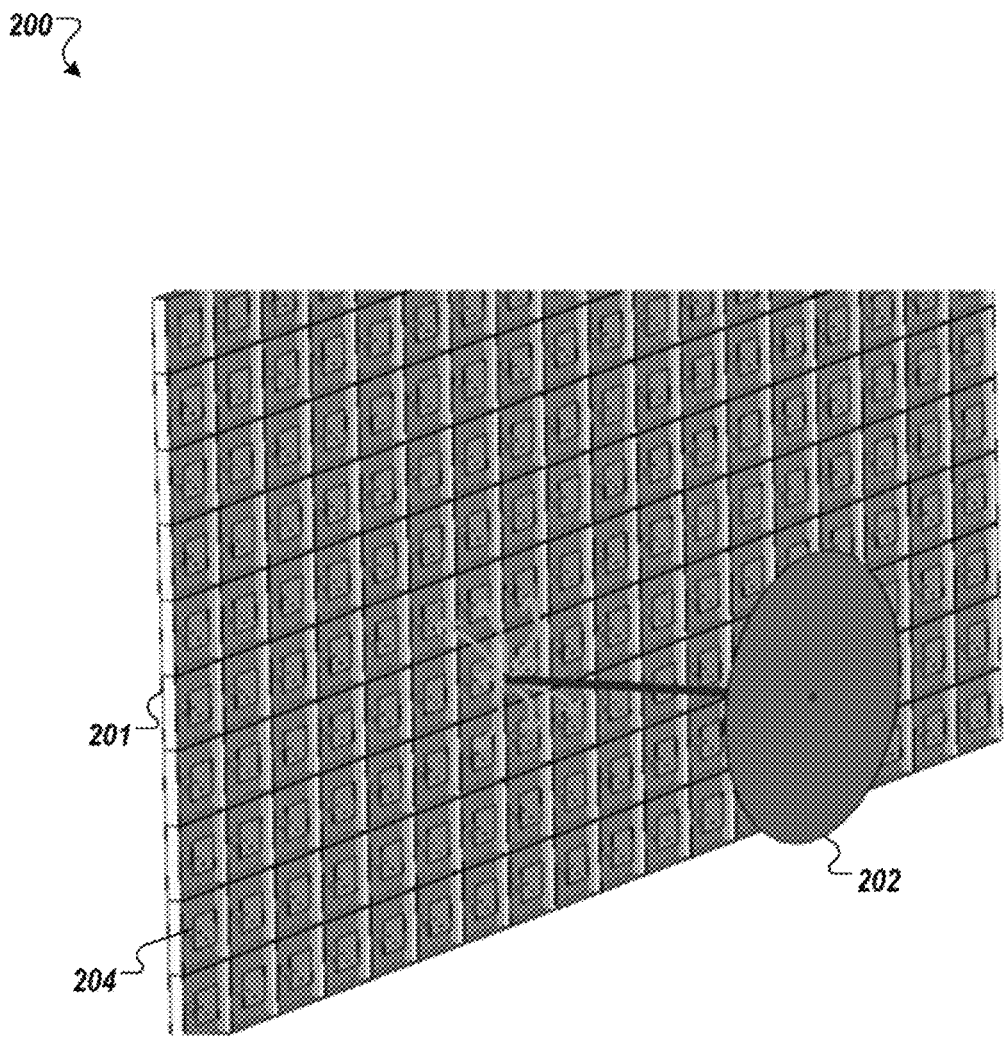
FIG. 2 illustrates a phased array antenna undergoing a one-time receive calibration according to one embodiment.

FIG. 2 illustrates a phased array antenna 200 undergoing a one-time receive calibration according to one embodiment. The phased array antenna 200 includes a set of antenna elements 204 arranged on a square grid and disposed on a support structure 201. Each of the antenna elements 204 can include an RX chain (not shown in FIG. 2), such as RX chain 110 of FIG. 1. During manufacturing, the phased array antenna 200 can have geometric deviations away from an ideal design due to finite mechanical tolerances. In addition, components of the RX chains can suffer from process variations, which can cause respective RX chains to have static differences in their parameter values, such as phase, amplitude gain, and/or time delay. This makes a one-time, in-factory calibration necessary to perform. The purpose of the one-time calibration is to accurately measure and compensate for these static differences between respective RX chains and/or antenna elements. The one-time calibration can also be used to generate a reference waveform. The reference waveform is the expected waveform to be compared during in-orbit calibrations, as described herein.

A phased array antenna, such as the phased array antenna 200, can be about 1 meter across, and a far-field measurement would need to be 100 meters away; thus for a one-time calibration, a moveable external calibration probe, such as an external calibration probe 202 can be used to perform a near-field calibration by scanning each antenna element. During the one-time calibration the external calibration probe 202 can be positioned in proximity to a first antenna element (e.g., reference antenna element) or a first set of antenna elements. An antenna element refers to an antenna element along with an associated RX chain and RFFE circuit (such as the antenna element 116, the RX chain 110, and the RFFE circuit 102 of FIG. 1). The external calibration probe 202 can send a calibration signal to the first antenna element. A response, such as an amplitude and phase response to the calibration signal, of the first antenna element can be measured. The external calibration probe 202 can then be positioned in proximity to a second antenna element. A response of the second antenna element can be compared to the response of the first antenna element, and at least one of a phase correction value, an amplitude gain correction value, or a time-delay correction value can be adjusted for at least one component of the RX chain associated with the second antenna element. The process can be repeated for each antenna element of the phased array antenna 200. The probe can be positioned at exactly the same distance and angle from an ideal or theoretical position of each antenna element. Doing so allows for measuring the responses of each antenna element relative to the first (reference) antenna element.

In another embodiment, a first set of responses of a first set of antenna elements to a calibration signal from the external calibration probe 202 can be measured concurrently or simultaneously when the external calibration probe is at a first position. Then, a second set of responses for a second set of antenna elements to the calibration signal from the external calibration probe 202 can be measured concurrently or simultaneously when the external calibration probe 202 is at a second position. In some cases, the first set of antenna elements and the second set of antenna elements overlap. The second set of responses can be compared to the first set of responses, and at least one of a phase correction value, an amplitude gain correction value, or a time-delay correction value can be adjusted for at least one component of an RX chain associated with an antenna element in the second set of antenna elements. In this way, an over-determined system can be obtained and the responses can be used to estimate potential errors in the position of the external calibration probe 202. A known estimated error in the position of the external calibration probe 202 can be accounted for during calibration of the antenna elements and can allow for relaxing constraints on the position of the external calibration probe during calibration.

It should be noted that although the phased array antenna 200 is depicted as having a set of antenna elements arranged on a square grid, in other embodiments, the set of antenna elements can be arranged in any other pattern suitable for beamforming and beam steering. It should also be noted that the functionality of the external calibration probe 202 can be incorporated into one or more embedded calibration probes disposed in connection with the phased array antenna, as described herein. Alternatively, the functionality of the external calibration probe 202 can be incorporated into one or more of the antenna elements of the phased array antenna 200. That is, some of the antenna elements of the phased array antenna 200 can be dedicated or repurposed during calibration.

Figure 3:
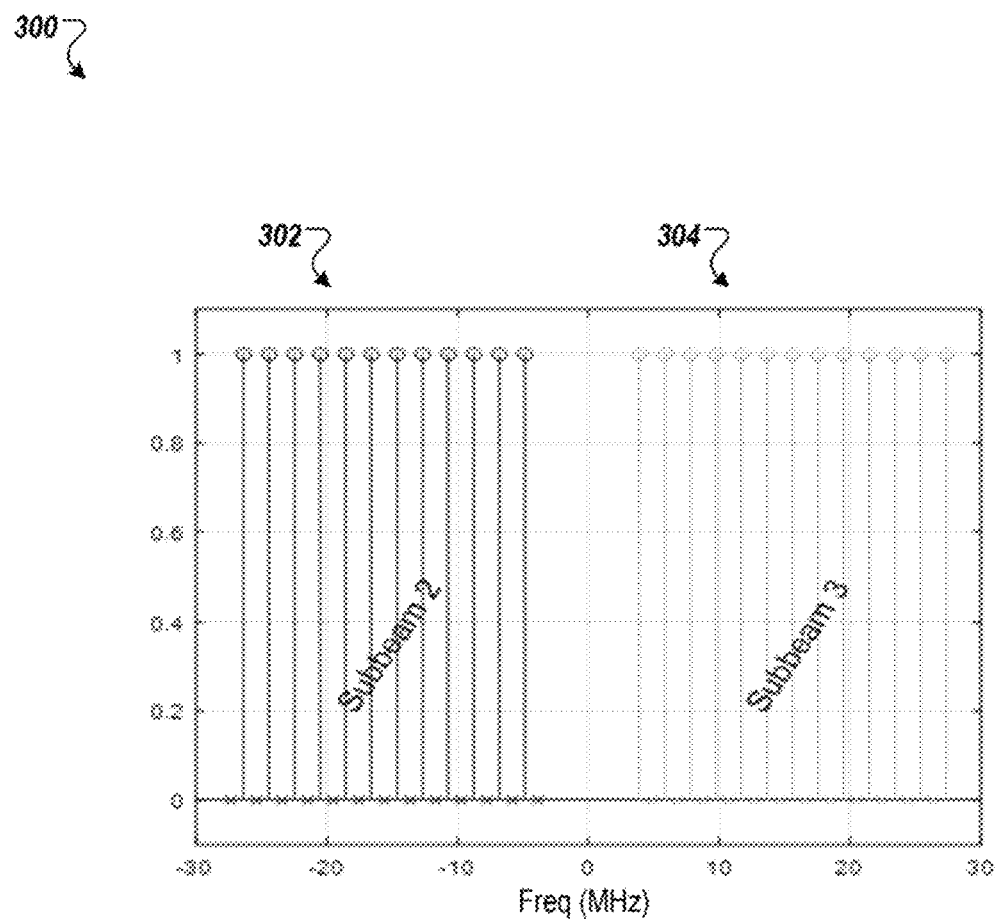
FIG. 3 is a graph illustrating a multi-tone waveform for a one-time calibration according to one embodiment.

FIG. 3 is a graph illustrating a multi-tone waveform 300 for a one-time calibration according to one embodiment. As described above, a waveform refers to a frequency response of a signal. Additionally or alternatively, a waveform can refer to a relative-amplitude profile of a signal as a function of frequency. Alternatively, a waveform can refer to a wavelength response, a power response, or other response of a signal. A one-time calibration, such as the one-time calibration process described with respect to FIG. 2, can be affected by a waveform of the calibration signal that is transmitted by an external calibration probe, such as the external calibration probe 202 of FIG. 2. The waveform of the calibration signal can be chosen to optimize between the speed and accuracy of the calibration, and to facilitate a determination of amplitude gain and phase offsets at different frequencies over a frequency bandwidth that is supported by each antenna element (or RX chain, such as the RX chain 100 of FIG. 1). For example, if an antenna element supports a bandwidth of 200 mega-hertz (MHz), the waveform of the calibration signal can have a granularity of sub-beam spacing of 25 MHz. For another example, as illustrated in FIG. 3, the spacing between the sub-beams, such as between sub-beams 2 and 3, is approximately 10 MHz and a width of the sub-beams is approximately 20-25 MHz with 2 MHz resolution. Increasing the granularity of the sub-beam spacing can increase the accuracy of a determination of time delays between antenna elements for each individual sub-beam. The example multi-tone waveform 300 includes a set of tones. A tone can refer to a portion of the waveform at a given frequency or range of frequencies that is smaller than a separation between tones. A set of tones can include a first subset 302 of tones and a second subset 304 of tones. The first subset 302 can each have a frequency that is less than a center frequency (also referred to as a carrier frequency, or an operating frequency) (e.g., 29 GHz). Each tone of the first subset 302 can be separated by a frequency spacing from each adjacent tone. The second subset 304 can each have a frequency that is greater than the center frequency. Each tone of the second subset 304 can be separated by the frequency spacing from each adjacent tone. Each tone of the second subset 304 can be a mirror image of each tone of the first subset 302 around the center frequency. In one embodiment, each tone of the second subset 304 is offset from the center frequency. In another embodiment, the tones in the first subset 302 and the second subset 304 are chosen such that a mirror image of each tone is unoccupied. This can help facilitate making a determination of an in-phase/quadrature (IQ) imbalance.

During a one-time calibration, factors such as a transmit power level and the peak-to-average power ratio (PAPR) of the calibration signal from the external calibration probe do not present a concern since the external calibration probe 202 can be powered by an external power source (e.g., rather than by the same power source as the phased array antenna). However, transmit power level and PAPR can be a concern during in-orbit calibration.

It should be noted that, although shown as a discrete multi-tone waveform in FIG. 3, other waveforms (e.g., a sinusoidal waveform, a single tone or continuous wave (CW) waveform, a square waveform, a sawtooth waveform, or the like) can be used for the calibration signal. During calibration, there can be a trade-off among the accuracy of the calibration and the speed and cost of the calibration. The choice of the waveform of the calibration signal can affect the tradeoff. Table 2 below lists example specifications and desired accuracy levels of calibration.

TABLE 2

| Quantity | Value | Units | Confidence |
| --- | --- | --- | --- |
| Amplitude error | 0.1 | dB | 90% |
| Phase error | 5 | deg | 90% |
| Delay error | 500 | ps | 90% |
| Calibration speed | 10 | min | NA |

Figure 4:
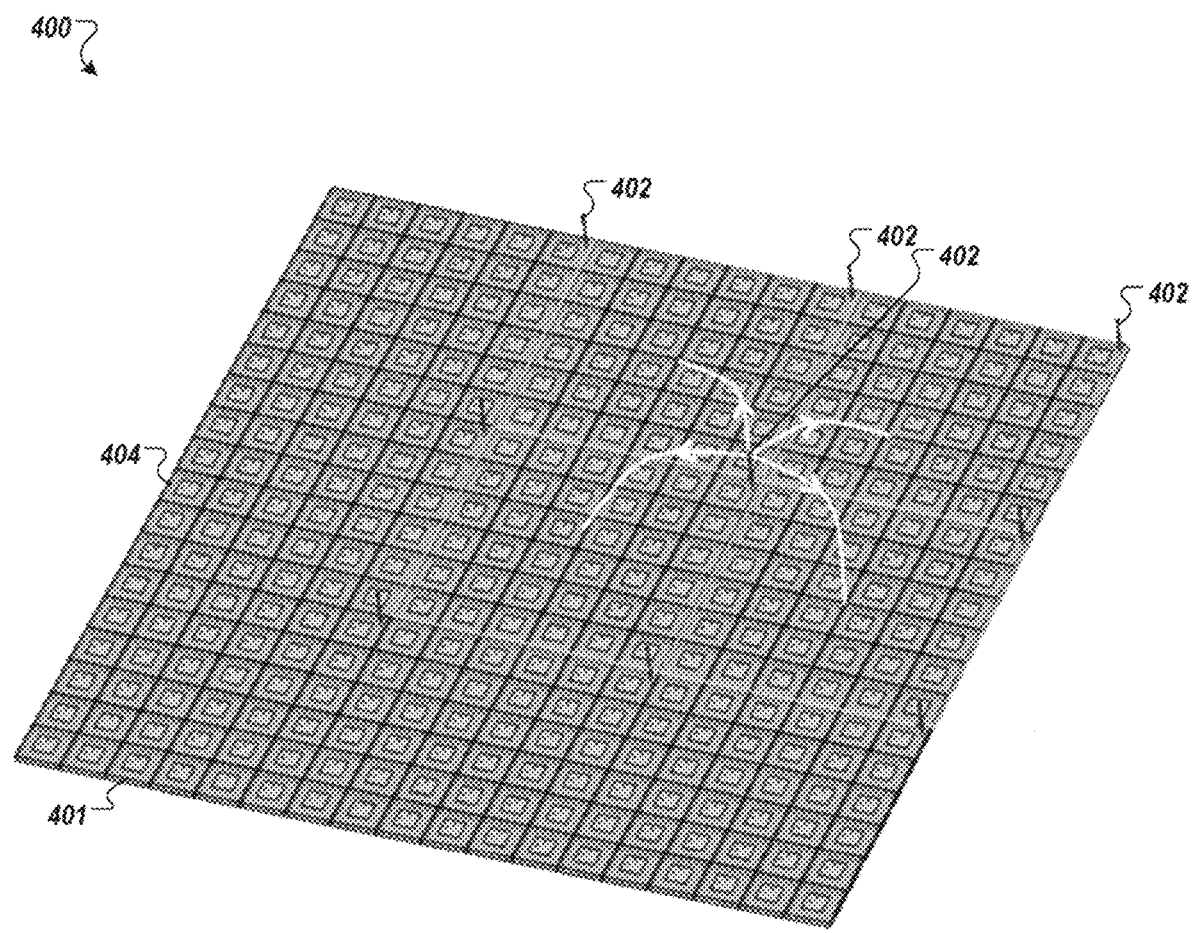
FIG. 4 illustrates a phased array antenna with calibration probes embedded between elements of the phased array antenna for in-orbit calibration according to one embodiment.

FIG. 4 illustrates a phased array antenna 400 with calibration probes 402 embedded between elements of the phased array antenna 400 for in-orbit calibration according to one embodiment. A calibration probe is an antenna that is used for calibrating the elements of the phased array antenna. The phased array antenna 400 includes a set of antenna elements 404 arranged on a square grid and disposed on a support structure 401. Each of the antenna elements 404 can be coupled to a RX chain (not shown in FIG. 4), such as the RX chain 100 of FIG. 1. The calibration probes 402 can be coupled to one or more separate radios or separate ports of the same radio as the phased array antenna 400. The calibration probes 402 can be similar or dissimilar to the antenna elements of a phased array antenna. For example, the antenna elements can be patch antennas and the calibration probes 402 can be monopole elements. In the phased array antenna 400, there are less calibration probes 402 than antenna elements. As illustrated in FIG. 4, the calibration probes 402 can be located on the surface of the support structure 401 and adjacent to some of the antenna elements. The calibration probes 402 can be embedded at regular, strategic locations within a perimeter of the antenna elements. A phased array antenna can also be referred to as an array panel. In some cases, the phased array antenna can be made up of multiple array panels. In another embodiment, rather than being located on the surface of a support structure and adjacent to some of the antenna elements, the calibration probe is disposed in proximity to the set of antenna elements. In another embodiment, the calibration probe is disposed on a same surface as the antenna elements. In another embodiment, the calibration probes are disposed among the antenna elements. In another embodiment, the calibration probes are embedded between elements of the phased array antenna. In another embodiment, the calibration probes are embedded within a perimeter of the antenna elements.

In the calibration mode shown in FIG. 4, the embedded calibration probes 402 are configured to operate as a set of transmit probes for calibrating the elements of the phased array antenna 400. Each of the set of transmit probes can be a probe element or simply an antenna element, but an antenna element that is not part of the phased array antenna 400 itself for receiving data. The calibration probes 402 are also referred to as auxiliary probes since they are note used as part of the phased array antenna, which would be considered the main antenna.

In-orbit calibration can be done regularly in order to track and remove dynamic uncertainties for a phased array antenna. Some dynamic uncertainties can be slow-changing (e.g., a change that occurs in a time that is longer than the time it takes for a satellite to complete approximately one orbit). Slow-changing dynamic uncertainties can be caused by aging of elements or by failure of elements. Slow-changing dynamic uncertainties can be handled through a closed-loop calibration procedure that occurs during idle times when the phased array antenna is not receiving a signal. Other dynamic uncertainties can be fast-changing (e.g., a change that occurs in a time that is shorter than the time it takes for a satellite to complete approximately one orbit). Fast-changing dynamic uncertainties can occur due to temperature, voltage, load, or other parameter changes. Fast-changing dynamic uncertainties need to be handled even when the phased array antenna is actively receiving signals (e.g., in active reception), and can be handled by an open-loop calibration.

In order to perform a closed-loop calibration, a reference waveform must be obtained for each pair of calibration probes 402 and antenna elements 404. Reference waveforms can be obtained immediately after a one-time calibration (e.g., such as the one-time calibration described with respect to FIG. 2). A reference waveform can also be referred to as a golden waveform or a golden standard. To obtain a reference waveform, the calibration probes 402 can be turned on sequentially and separately to generate and transmit a calibration signal. The response of a set of antenna elements of the phased array antenna 400 that receives the calibration signal (e.g., those antenna elements that are sufficiently close to the transmit probe that is transmitting) can be measured, and a response waveform of each of the set of antenna elements can be obtained and stored in a memory device to be used for slow-calibration. In some embodiments, a reference waveform is obtained and stored for each pair of antenna element and transmit probe that are within communication range. In other embodiments, a reference waveform is obtained and stored for every pair of antenna element and transmit probe. The reference waveform can be stored for the entire phased array antenna 400. Alternatively, a reference waveform can be stored for subsets of the entire phased array antenna 400, such as by array panels, or the like.

Closed-loop calibration is performed during idle times. During idle times, when the phased array antenna 400 is not transmitting or receiving a signal, the entire bandwidth of the phased antenna receive array is available for a duration of time. During the idle time, it can be possible to directly measure changes that have occurred in the phased array antenna 400. This can be done by using the calibration probes 402 that are embedded within the phased array antenna 400. In one embodiment, the calibration probes 402 can be turned on sequentially and separately to generate and transmit a calibration signal. The response of a set of antenna elements of the phased array antenna 400 that receive the calibration signal (e.g., those antenna elements that are sufficiently close to the transmit probe that is transmitting) can be measured. In this way, a response waveform of each of the set of antenna elements can be obtained and compared to the respective reference waveform. For any given pair of antenna element and transmit probe, if the measured response waveform is different than the respective reference waveform, then a calibration can be performed. Any deviation of the measured response waveform from the respective reference waveform indicates a change in the offsets of at least one of the phase, amplitude gain, or time delay values. In some embodiments an antenna element only receives a calibration signal from one transmit probe during the slow-calibration process. In other embodiments, the antenna element receives a calibration signal from more than one transmit probe during the slow calibration. In this case, an over-determined system is obtained, and as a result, the transmit probes themselves can be calibrated. Table 3 below lists example specifications and desired accuracy levels of calibration for the phase, amplitude gain, and time delay values as well as a desired calibration speed for an open-loop calibration process.

TABLE 3

| Quantity | Value | Units | Confidence |
|---|---|---|---|
| Amplitude error | 0.1 | dB | 90% |
| Phase error | 5 | deg | 90% |
| Delay error | 500 | ps | 90% |
| Calibration speed | 10 | min | NA |

In one embodiment, a phased array antenna includes a set of antenna elements disposed on a surface of a support structure. A first radio is coupled to the phased array antenna, and the first radio includes at least one RFFE component that has a phase parameter value, a gain parameter value, and a time-delay parameter value. Each of the parameter values is adjustable for calibrating a phase, a gain, or a time-delay of a signal path between the first radio and one of the antenna elements. A probe element (e.g., a calibration probe) is located on the surface of a support structure and adjacent to some of antenna elements. A second radio is coupled to the probe element. The second radio generates and sends a first signal via the probe element. The first signal has a multi-tone waveform with a set of tones covering a fixed bandwidth. The set of tones can be within a separate portion of the fixed bandwidth. Each tone of the set of tones occupies a certain non-overlapping frequency range within the fixed bandwidth. A memory device stores a reference waveform that was obtained immediately after a one-time in-factory calibration. The first signal, which is transmitted by the second radio, is received at the first radio and processed to obtain a second signal that is a response of the first radio and the first antenna element receiving the first signal. The second signal is received at the first radio via a first signal path between a first antenna element of a set of antenna elements and the first radio. A second waveform of the second signal is measured, and a difference between the second waveform and the reference waveform is determined. The difference includes at least one of an amplitude difference or a frequency difference between a first portion (e.g., a portion of a reference signal between a first frequency and a second frequency) of the reference waveform and a second portion (e.g., a portion of the second signal between a third frequency and a fourth frequency) of the second waveform, the second portion being a response to a first tone of the multi-tone waveform and the first portion being a response to the first tone. In some cases, a response to a tone of a multi-tone waveform can include a range of frequencies (e.g., from the first frequency to the second frequency or from the third frequency to the fourth frequency) due to dispersion or other effects. At least one of the phase parameter value, the gain parameter value, or the time-delay parameter value can be adjusted based on the difference. For example, the gain parameter value can be adjusted based on determining that an amplitude of the second portion is different than an amplitude of the second portion. As another example, a phase parameter value can be adjusted based on determining that the first frequency is different than the third frequency and/or the second frequency is different than the fourth frequency.

In another embodiment, rather than being located on the surface of a support structure and adjacent to some of the antenna elements, the probe element is disposed in proximity to the set of antenna elements. In another embodiment, the probe element is disposed on a same surface as the set of antenna elements. In one embodiment, the probe element is disposed among the set of antenna elements.

The power of the signal transmitted by each transmit probe is typically such that the nearest antenna elements are not saturated while the farthest ones still receive a sufficient signal power. The difference between the two power levels is referred to as the dynamic range. There can be a trade-off between the degree of overlap between antenna elements that are shared by multiple transmit probes and the required dynamic range for each transmit probe. A large overlap (e.g., one antenna element receives a signal from a larger number of transmit probes) can provide more observations, which can reduce error in calibration and in estimating offsets that require compensation. However, establishing a large overlap can require either a larger number of transmit probes or a higher power cost in order to power the transmit probes. The power provided to the transmit probes should be limited as they share the same power source as the phased array antenna. It should be noted that for a one-time calibration, such as the one-time calibration described with reference to FIG. 2, the dynamic range of the external calibration probe may not be a concern since it can be powered by an external power source.

Alternatively, when dynamic uncertainties are quickly changing, an open-loop calibration can be performed. The open-loop calibration can be performed even when the phased array antenna is actively receiving a signal. There are a number of factors, such as temperature, voltage, impedance, drift, noise, and the like that can cause the phase parameter value, the gain parameter value, or the time-delay parameter values to acquire offsets that require calibration. These factors can be measured with a sensor, such as a thermometer, a voltmeter, a counter, or the like. These factors can be measured using one or more external or internal sensors of the system. These factors can be measured for open-loop calibration. Some of these factors may not be applicable for closed-loop calibration. A temperature gradient can exist across the phased array antenna 400. The effect of temperature on an RX chain can be measured in-factory and stored for open-loop in-orbit calibrations. The in-factory measurements can be stored as pre-calibrated lookup tables or formulas.

In one embodiment, a table can be stored in a memory device of the phased array antenna. The table stores a first set of fixed parameter offset values for a first operating condition, a second set of fixed parameter offset values for a second operation condition, a third set of fixed parameter offset values for a third operating condition, and so on. The sets of fixed parameter offset values indicate at least a phase parameter value offset, a gain parameter value offset, and a time-delay parameter value offset. In other words, the first set of fixed parameter offset values indicates at least a first phase parameter value offset, a first gain parameter value offset, and a first time-delay parameter value offset, while the second set of fixed parameter offset values indicates at least a second phase parameter value offset, a second gain parameter value offset, and a second time-delay parameter value offset, the third set of fixed parameter offset values indicates at least a third phase parameter value offset, a third gain parameter value offset, and a third time-delay parameter value offset, and so on. In this case, an offset can refer to a value by which a parameter value is to be adjusted. For example, a component of the TX chain can be determined to be operating in the first operating condition and the first set of fixed parameter offset values can be applied. Alternatively, the component of the TX chain can be determined to be operating in a second operating condition and the second set of fixed parameter offset values can be applied.

In other embodiments, the table stores multiple sets of parameter value settings for corresponding operating conditions. In other embodiments, the table stores sets of percentage values by which the parameters should be changed for corresponding operating condition.

In one embodiment, the operating condition refers to states of components of the RX chain. For example, a first operating condition can correspond to a temperature of a component of the RX chain being within a first range of temperatures while a second operating condition can correspond to the temperature of the component being within a second range of temperatures. If the temperature of the component is measured to be within the first range of temperatures, corresponding to the first operating condition, then in order to perform the open-loop calibration, the first set of parameter value offsets can be applied to the component. On the other hand, if the temperature of the component is measured to be within the second range of temperatures, corresponding to the second operating condition, then the second set of parameter value offsets can be applied to the component. Additionally or alternatively, the operating conditions can refer to operating voltage states, impedance states (e.g., of amplifier components), gain states (e.g., of VGAs), phase noise and/or drift (e.g., of the LO), and the like. A value of a physical property can be measured which can indicate an operating condition. At least one of the phase parameter value, the gain parameter value, or the time-delay parameter value of the component can be modified based on a measurement of the value of the physical property and the corresponding operating condition.

Gain settings of various components, such as VGAs in an RX chain can vary based on an observed interference to keep inputs to ADCs within their dynamic range. In some embodiments, all of the gain settings for each receiver path can change together. VGAs can be designed to have similar, or nearly the same, phase and group delay characteristics for all gain settings such that the calibration can be independent of the gain settings. In other embodiments, an in-factory calibration can be repeated at each setting and stored for open-loop in-orbit calibrations. In addition, a local oscillator (LO) can drift and produce phase noise. The effect of LO drift and phase noise can be measured in-factory and stored for open-loop in-orbit calibrations. It should be noted that phase changes through a low noise amplifier (LNA) (e.g., such as the amplifier 114 of FIG. 1) as a function of its source impedance are not expected to present calibration issues since each antenna element can be designed to have a low return loss. Because beam forming and the creation of multi-beams happen later in an RX chain in a digital beam former (DBF), each antenna element can be expected to experience the same or similar reflection, and the LNA can be expected to receive the same or similar input power. As a result, the effect of multi-beams on the phase of the LNA is not expected to present a calibration issue.

It should be noted that although the phased array antenna 400 is depicted as having a set of antenna elements arranged on a square grid, in other embodiments, the set of antenna elements can be arranged in any other pattern suitable for beamforming and beam steering.

Figure 5:
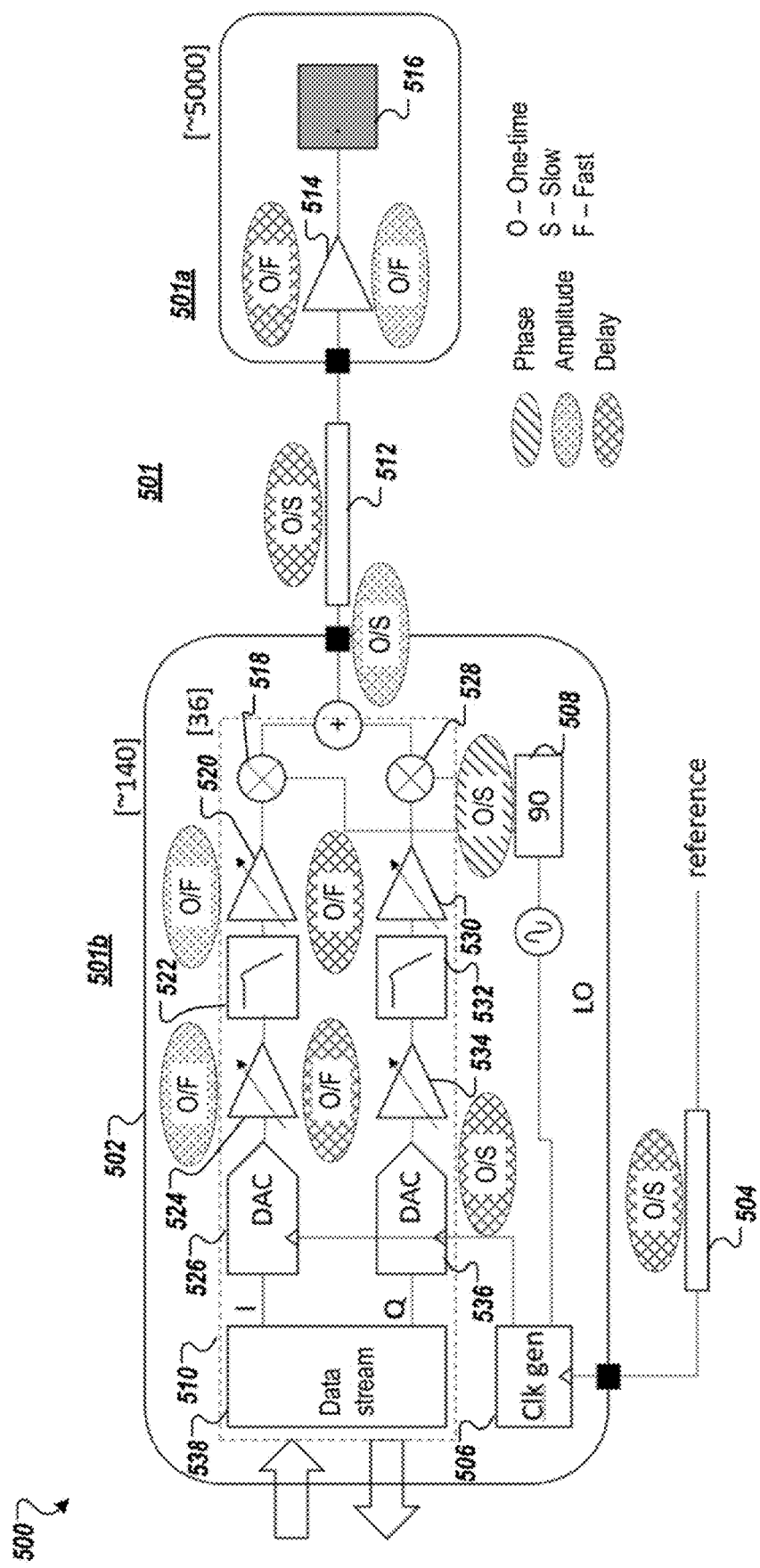
FIG. 5 is a schematic diagram of a transmitter chain associated with each antenna element of a phased array antenna according to one embodiment.

FIG. 5 is a schematic diagram of RFFE circuitry 500 with multiple TX chains 510, with each TX chain being coupled to an antenna element of a phased array antenna according to one embodiment. In general, a chain or a TX chain is a set of electronic components (e.g., may include amplifiers, filters, mixers, attenuators, detectors, or the like) that are cascaded between an antenna element and a processing device, such as a baseband processor, and that are used for signal processing wireless signals. A TX chain is a set of electronic components that generate and transmit outgoing RF signals received at an antenna element coupled to the TX chain. A TX chain can also be referred to as a transmitter. RX and TX chains can be used as part of a MIMO radio or part of a set of multiple radios. In some embodiments, the TX chain 510 can be part of a transceiver that also includes an RX chain. The RFFE circuitry 500 can include multiple TX chains 510 for a phased array antenna, which can include many antenna elements, such as illustrated with approximately 5000 antenna elements. For the 5000 antenna elements, 36 TX chains 510 can operate in a first RFFE circuit 502, which includes a clock generator 506, a local oscillator 507, and a phase shifter 508. The first RFFE circuit 502 can be replicated 140 times in order to couple each TX chain 510 to one of the 5000 antenna elements. The antenna elements can be disposed on a first surface 501a of a support structure 501 and the TX chain 510 can be disposed on a second surface 501b of the support structure 501. Alternatively, the RFFE circuitry 500 can be disposed on the same surface as the antenna elements. The support structure 501 can be a circuit board, such as a PCB or other structure upon which the TX chain(s) 510 can be positioned.

The first RFFE circuit 502 can include a reference signal that is input via a reference line 504 to the clock generator 506. A local oscillator 507 is coupled to the clock generator 506 and the phase shifter 508. The local oscillator 507 provides a timing signal. As noted above, the first RFFE circuit 502 includes thirty-six instances of the TX chain 510 for each clock generator 506 and the phase shifter 508. The first RFFE circuit 502 can include some external components that are separate from the circuit board, such as an amplifier 514 that is located in closer proximity to an antenna element 516. In this case, a pin of the first RFFE circuit 502 is coupled to a transmission line 512 that is coupled to the amplifier 514.

In a first signal path of the TX chain 510, such as the in-phase signal path (e.g., for I samples), a digital-to-analog converter (DAC) 526 is coupled to a data stream circuitry 538. The data stream circuitry 538 can include a buffer to store the I samples for the DAC 526. The DAC 526 can be coupled to a VGA 524. The VGA 524 can be coupled to a filter 522. The filter 522 can be coupled to a VGA 520. The VGA 520 can be coupled to mixer 518. The mixer 518 is coupled to the transmission line 512. In a second signal path of the TX chain 510, such as the quadrature path (e.g., for Q samples), a DAC 536 is coupled to a data stream circuitry 538. The data stream circuitry 538 can include a buffer to store the Q samples for the DAC 536. The DAC 536 can be coupled to a VGA 534. The VGA 534 can be coupled to a filter 532. The filter 532 can be coupled to a VGA 530. The VGA 530 can be coupled to mixer 528. The mixer 528 is coupled to the transmission line 512.

The principles of calibration can be the same or similar for the calibration of the RX chains and the TX chains with some differences in the procedures. A one-time calibration of the phased array antenna requires a calibration of each TX chain 110. Calibration of a TX chain 110 can involve determining and compensating for static geometric uncertainties and electrical uncertainties than can arise due to manufacturing tolerances and process variations. For example, each of the amplifiers 514, 520, 524, 530, and 534, the transmission line 512, the DACs 526 and 536, the reference line 504, the phase shifter 508, and the RFFE 502 can undergo a one-time calibration, as described further with respect to FIG. 6. More specifically, the phase shifter 508 can undergo a one-time phase calibration to adjust a phase parameter value. The amplifiers 514, 520, 524, 530, and 534 and the RFFE 502 can undergo a one-time amplitude gain calibration to adjust a gain parameter value. The amplifiers 514, 520, 524, 530, and 534, the DACs 526 and 536, the transmission line 512, and the reference line 504 can undergo a one-time calibration to calibrate a time-delay parameter value. It should be noted that no quantity is entirely static and each will experience at least some amount of dynamic change.

In addition to a one-time calibration, each of the above-mentioned components can require further calibrations due to dynamic changes, such as due to temperature changes, voltage changes, load changes, aging, and the like, similar to the case of a RX chain, such as the RX chain 100 of FIG. 1.

In orbit, the TX chain 110 can transmit a signal via the antenna element 516. The data stream circuitry 538 can have a buffer to store samples I and Q samples for the DACs 526 and 536 respectively. For the in-phase signal, the I samples are converted to an analog signal by the DAC 526. When the TX chain 110 is not actively transmitting a signal, the DAC 526 can undergo a slow time-delay calibration. The signal can then be passed through the VGA 524, the filter 522, and the VGA 520 to be amplified and filtered. The VGAs 524 and 520 can undergo a fast amplitude gain calibration and a fast time-delay calibration. The signal can then be passed through the mixer 518 to be mixed with a signal from the clock generator 506. The clock generator 506 receives a reference signal through the reference line 504. When the TX chain 510 is not actively receiving a signal, the reference line 504 can undergo a slow time-delay calibration. For the quadrature signal, the Q samples are converted to an analog signal by the DAC 536. When the TX chain 110 is not actively transmitting a signal, the DAC 536 can undergo a slow time-delay calibration. The signal can then be passed through the VGA 534, the filter 532, and the VGA 530 to be amplified and filtered. The VGAs 534 and 530 can undergo a fast amplitude gain calibration and a fast time-delay calibration. The signal can then be passed through the mixer 528 to be mixed with a 90 degree phase-shifted signal from the clock generator 506. The signals from the upper line and the lower line can then be combined into a mixed signal and the mixed signal can be passed through the transmission line 512. When the TX chain 110 is not actively transmitting a signal, the transmission line 512 can undergo a slow time-delay calibration. The mixed signal can be amplified by the amplifier 514. The amplifier 514 can undergo a fast amplitude gain calibration as well as a fast time-delay calibration. The amplifier 514 can be affected by changes or fluctuations in temperature and voltage, in addition to combined load characteristics of each transmitter chain, which can vary rapidly.

The slow time-delay calibrations can result from aging of the TX chain 510, which can in some cases result in expansion or compression of signal lines, such as the transmission line 512, the reference line 504, and the like. In some embodiments, the VGAs 520, 524, 530, and 534 can be designed such that their gain settings have minimal impact on their phase and group delay characteristics. In such a case, performing a calibration at a single gain setting can be sufficient. In other embodiments, the calibration of VGAs 520, 524, 530, and 534 should be performed at more than one gain settings.

In one embodiment, the amplifier 514 is a power amplifier. In other embodiments, the amplifier 514 is a low noise amplifier. In other embodiments, the amplifier 514 can be a variable gain amplifier, an RF amplifier, or other type of amplifier. Though depicted in FIG. 5 as VGAs, the VGAs 520, 524, 530, and 534 can alternatively be low noise amplifiers, RF amplifiers, or the like.

In the case where the amplifier 514 is a power amplifier, it should be noted that power amplifiers can have a varying reflection from each transmitting antenna element, particularly in a multi-beam setting and can potentially have different phase offsets that can be corrected for or calibrated.

It should be noted that since beamforming is an entirely digital operation involving no analog phase shifters or attenuators, it may not be necessary to calibrate each transmitter chain for every phase and amplitude gain setting of the beam former.

It should also be noted that the architecture of the RFFE circuitry 500 in FIG. 5 is a ZIF type architecture that uses mixers to up-convert the baseband signals at intermediate frequencies to RF signals at radio frequencies. In other embodiments, the RFFE circuitry 500 can include other combinations of components, such as an architecture without mixers. The RFFE circuitry 500 also has in-phase and quadrature signals paths, whereas other embodiments, may not have two signal paths. In these cases, the RFFE circuitry 500 may not include the phase shifter 508.

Figure 6:
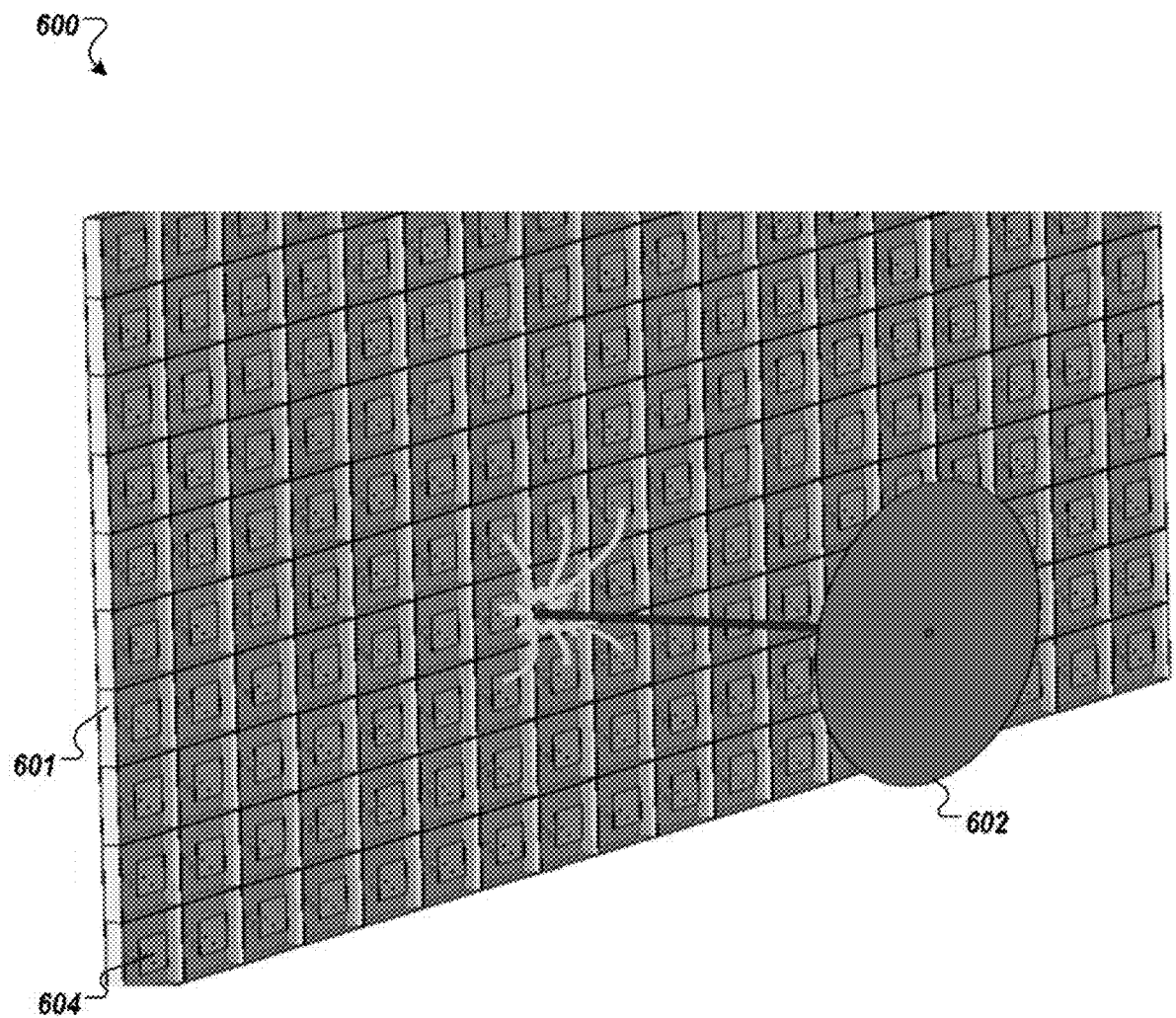
FIG. 6 illustrates a phased array antenna undergoing a one-time transmit calibration according to one embodiment.

FIG. 6 illustrates a phased array antenna 600 undergoing a one-time transmit calibration according to one embodiment. The phased array antenna 600 includes a set of antenna elements 604 arranged on a square grid and disposed on a support structure 601. Each of the antenna elements 604 can include a TX chain (not shown in FIG. 6), such as the TX chain 510 of FIG. 5. During manufacturing, the phased array antenna 600 can have geometric deviations away from an ideal design due to finite mechanical tolerances. In addition, components of the TX chains can suffer from process variations, which can cause respective TX chains to have static differences in their parameter values, such as phase, amplitude gain, and/or time delay. This makes a one-time, in-factory calibration necessary to perform. The purpose of the one-time calibration is to accurately measure and compensate for these static differences between respective TX chains and/or antenna elements.

As described above, a phased array antenna such as the phased array antenna 600 can be about a meter across, and a far-field measurement would need to be 100 meters away; thus for a one-time calibration, a moveable external calibration probe, such as an external calibration probe 602 (e.g., a calibration probe) can be used to perform a near-field calibration by scanning each antenna element. During the one-time calibration the external calibration probe 602 can be positioned in proximity to a first antenna element (e.g., reference antenna element). An antenna element refers to an antenna element along with an associated TX chain and RFFE circuit (such as the antenna element 516, the TX chain 510, and the RFFE circuit 502 of FIG. 1). The first antenna element can send a first calibration signal to the external calibration probe 602. The external calibration probe 602 receives the calibration signal, and a first response, such as an amplitude and phase response, of the external calibration probe 602 can be measured. The first response can be used as a reference response. The external calibration probe 602 can then be positioned in proximity to a second antenna element. The second antenna element can send a second calibration signal to the external calibration probe 602. The external calibration probe 602 can receive the second calibration signal, and a second response of the external calibration probe 602 can be measured. The second calibration signal can be the same as the first calibration signal. The second response can be compared to the first response, and at least one of a phase correction value, an amplitude gain correction value, or a time-delay correction value can be adjusted for at least one component of the TX chain associated with the second antenna element. The process can be repeated for each antenna element of the phased array antenna 600. The probe can be positioned at exactly the same distance and angle from an ideal or theoretical position of each antenna element. Doing so allows the external calibration probe 602 to measure its response to the transmitted signals of each antenna element relative to its response to the calibration signal transmitted by the reference antenna element.

In another embodiment, the response of the external calibration probe 602 to receiving more than one signal (e.g., from a set of nearby antenna elements) can be measured. The more than one signal can be received sequentially, concurrently, or simultaneously. The external calibration probe 602 can be positioned at a first position and a first set of nearby antenna elements can each transmit a calibration signal. The first response of the external calibration probe to receiving the calibration signals can be measured and used as a reference response. The external calibration probe 602 can then be positioned at a second position and a second set of nearby antenna elements can each transmit a calibration signal. The second response of the calibration probe to receiving the calibration signals can be measured. The second response can be compared to the reference response. At least one of a phase correction value, an amplitude gain correction value, or a time-delay correction value can be adjusted for one or more antenna element in the second set of nearby antenna elements. By allowing the external calibration probe 602 to receive more than one signal concurrently or simultaneously, the accuracy of the calibration can be improved.

In one embodiment, the external calibration probe receives a calibration signal from each antenna element of the set of nearby antenna elements sequentially. In another embodiment, the external calibration probe receives a calibration signal from each antenna element of the set of nearby antenna elements concurrently or simultaneously. In order for the external calibration probe to distinguish the calibration signals that are transmitted concurrently or simultaneously, each antenna element in the set can transmit orthogonal signals (e.g., in a frequency domain or a code domain).

A one-time calibration, such as the one-time calibration process described with respect to FIG. 6, can be affected by a waveform of the calibration signal that is transmitted by an antenna element. Waveform requirements for calibrating a phased transmit antenna array can be slightly different than waveform requirements for calibrating a phased receive antenna array. It should be noted that a phased array antenna includes both the phased transmit antenna array and the phased transmit receive array. For calibrating a phased transmit antenna array, the waveform should allow for calibration at different frequencies. To allow for calibration at different frequencies, the granularity of a sub-beam can be 62.5 MHz wide and the can cover a bandwidth of 500 MHz. A finer frequency granularity can increase accuracy in determining a time delay between antenna elements. Additionally, there can be a need for the external calibration probe to distinguish between different calibration signals since multiple antenna elements can transmit a calibration signal to the external calibration probe. The methods for distinguishing signals can include separation in the time domain, frequency domain, code domain, or the like.

During calibration, there can be a trade-off among the accuracy of the calibration and the speed and cost of the calibration. The choice of the waveform of the calibration signal can affect the tradeoff. Table 4 below lists example specifications and desired accuracy levels of a one-time transmit calibration.

TABLE 4

| Quantity | Value | Units | Confidence |
| --- | --- | --- | --- |
| Amplitude error | 0.1 | dB | 90% |
| Phase error | 5 | deg | 90% |
| Delay error | 500 | ps | 90% |
| Calibration speed | 10 | min | NA |

In addition to the one-time calibration described above, in-orbit calibration can be done regularly in order to track and remove dynamic uncertainties for a phased array antenna. Some dynamic uncertainties can be slow-changing (e.g., a change that occurs in a time that is longer than the time it takes for a satellite to complete approximately one orbit). Slow-changing dynamic uncertainties can be caused by aging of elements or by failure of elements. Slow-changing dynamic uncertainties can be handled through a closed-loop calibration procedure that occurs during idle times when the phased array antenna is not transmitting a signal. Slow-changing dynamic uncertainties can be handled by closed-loop calibrations. Other dynamic uncertainties can be fast-changing (e.g., a change that occurs in a time that is shorter than the time it takes for a satellite to complete approximately one orbit). Fast-changing dynamic uncertainties can occur due to temperature, voltage, or other parameter changes. Fast-changing dynamic uncertainties need to be handled even when the phased array antenna is actively transmitting signals (e.g., in active reception), and can be handled by an open-loop calibration. Fast-changing dynamic uncertainties can be handled by open-loop calibrations.

Similarly to the in-orbit calibration described with respect to FIG. 4 for a phased array antenna, in-orbit calibration for a phased array antenna, such as the phased array antenna 600 of FIG. 6, can be done with embedded calibration probes (not shown in FIG. 6) placed strategically within a perimeter of the phased array antenna. That is, the calibration probes can be the same calibrations probes 402 that are illustrated and described above with respect to FIG. 4, but the calibration probes 402 can be configured to operate as a set of calibration probes for calibrating the elements of the phased array antenna 400 for transmitting data. The phased array antenna includes a set of antenna elements arranged on a square grid and disposed on a support structure. Each of the antenna elements can include a TX chain, such as the TX chain 510 of FIG. 5. The calibration probes can be similar to antenna elements of a phased array antenna. In the phased array antenna, there are less calibration probes than antenna elements. The calibration probes can be located on the surface of a support structure and adjacent to some of the antenna elements. The calibration probes can be embedded at regular, strategic locations within the perimeter of the antenna elements. In one embodiment, the calibration probes can constitute a second phased array antenna that is superimposed on the phased array antenna. The calibration probes are also referred to as auxiliary probes. In another embodiment, rather than being located on the surface of a support structure and adjacent to some of the antenna elements, the calibration probe is disposed in proximity to the set of antenna elements. In another embodiment, the calibration probe is disposed on a same surface as the set of antenna elements.

In order to perform a slow calibration, or a closed-loop calibration, a reference waveform must be obtained for each pair of calibration probes and antenna element. Reference waveforms can be obtained immediately after a one-time calibration as described above. A reference waveform can also be referred to as a golden waveform or a golden standard. Each antenna element can transmit a calibration signal. In one embodiment, the calibration signals are transmitted by each antenna element sequentially. The antenna elements can be turned on sequentially and separately to generate and transmit a calibration signal. The response of a first calibration probe that receives the calibration signals (e.g., from a set of antenna elements that are sufficiently close to the first calibration probe) can be measured. The process can be repeated for each calibration probe. In this way, a response waveform of each of the calibration probes can be obtained and compared to a respective reference waveform. For any given combination of antenna elements and calibration probe, if the measured response waveform is different than the respective reference waveform, then a calibration can be performed. Any deviation of the measured response waveform from the respective reference waveform indicates a change in the offsets of at least one of the phase, amplitude gain, or time delay values. The response waveforms can be obtained in a similar manner, except that it is performed immediately after the one-time calibration.

In another embodiment, the calibration signals are be transmitted by each antenna element concurrently or simultaneously with some orthogonality. A first set of calibration probes transmits a first set of calibration signals concurrently or simultaneously with some orthogonality. A first calibration probe receives the first set of a signals. A response waveform of the first calibration probe responsive to receiving the first set of signals is measured. The response waveform is compared to a respective response waveform. The respective response waveform is obtained in the same manner between the first set of calibration signals and the first calibration probe, except that it is performed immediately after a one-time calibration. If the first response waveform is different than the reference waveform, then a calibration can be performed on at least one of the first set of antenna elements. Any deviation of the first response waveform from the reference waveform indicates a change in the offsets of at least one of the phase, amplitude gain, or time delay values of at least one component of the one of the first set of antenna elements. The process for calibrating can be repeated for each set of antenna elements. In this way, an over-determined system can be obtained from which both the antenna elements and the calibration probes can be calibrated.

During calibration, there can be a trade-off among the accuracy of the calibration and the speed and cost of the calibration. The choice of the waveform of the calibration signal can affect the tradeoff. Table 5 below lists example specifications and desired accuracy levels of a closed-loop transmit calibration.

TABLE 5

| Quantity | Value | Units | Confidence |
|---|---|---|---|
| Amplitude error | 0.1 | dB | 90% |
| Phase error | 5 | deg | 90% |
| Delay error | 500 | ps | 90% |
| Calibration speed | 10 | min | NA |

In addition to the one-time calibration and the slow calibration described above, in some cases a fast calibration must be performed. When dynamic uncertainties are quickly changing, a fast-calibration can be performed. It should be noted that uncertainties in a phased transmit antenna array can be more pronounced than uncertainties in a phased receive antenna array. The fast calibration can be performed even when the phased array antenna is actively transmitting a signal. There are a number of factors, such as temperature, voltage, impedance, drift, noise, and the like that can cause the phase parameter value, the gain parameter value, and the time-delay parameter values to acquire offsets that require calibration. A temperature gradient can exist across the phased array antenna 600. The effect of temperature on a transmitter chain can be measured in-factory and stored for open-loop in-orbit calibrations. The in-factory measurements can be stored as pre-calibrated look-up tables or formulas.

In one embodiment, a table can be stored in a memory device of the phased array antenna. The table stores a first set of fixed parameter offset values for a first operating condition, a second set of fixed parameter offset values for a second operation condition, a third set of fixed parameter offset values for a third operating condition, and so on. The sets of fixed parameter offset values indicate at least a phase parameter value offset, a gain parameter value offset, and a time-delay parameter value offset. In other words, the first set of fixed parameter offset values indicates at least a first phase parameter value offset, a first gain parameter value offset, and a first time-delay parameter value offset, while the sec fixed parameter offset values indicates at least a second phase parameter value offset, a second gain parameter value offset, and a second time-delay parameter value offset, the third set of fixed parameter offset values indicates at least a third phase parameter value offset, a third gain parameter value offset, and a third time-delay parameter value offset, and so on. In this case, an offset can refer to a value by which a parameter value is to be adjusted. The phased array antenna can determine an operating condition and apply the corresponding set of fixed parameter offset values.

In other embodiments, the table stores multiple sets of parameter value settings for corresponding operating conditions. In other embodiments, the table stores sets of percentage values by which the parameters should be changed for corresponding operating condition.

In one embodiment, the operating condition refers to states of components of the TX chain. For example, a first operating condition can correspond to a temperature of a component of the TX chain being within a first range of temperatures while a second operating condition can correspond to the temperature of the component being within a second range of temperatures. If the temperature of the component is measured to be within the first range of temperatures, corresponding to the first operating condition, then in order to perform the open-loop calibration, the first set of parameter value offsets can be applied to the component. On the other hand, if the temperature of the component is measured to be within the second range of temperatures, corresponding to the second operating condition, then the second set of parameter value offsets can be applied to the component. Additionally or alternatively, the operating conditions can refer to operating voltage states, impedance states (e.g., of amplifier components), gain states (e.g., of VGAs), phase noise and/or drift (e.g., of the LO), and the like.

A power amplifier phase response (e.g., such as for the amplifier 514 of FIG. 5) can change significantly with a reflection that exists for each antenna element. The phase response for each power amplifier can vary widely for each antenna element, especially in a multi-beam environment. Such an effect may be difficult to calibrate but can be appropriately managed. Further, if gain settings of the VGAs are exercised, they can alter the phase and delay through the transmit chain. Such an effect can be handled either by ensuring that the phase and group delays of the VGAs do not change significantly with a gain setting, or by performing an in-factory one-time calibration at every gain setting. In addition, an LO can drift and produce phase noise. The effect of LO drift and phase noise can be measured in-factory and stored for open-loop in-orbit calibrations. It should be noted that phase changes through an LNA as a function of its source impedance are not expected to present calibration issues since each antenna element can be designed to have a low return loss. Because beam forming and the creation of multi-beams happen later in a RX chain in a DBF, each antenna element can be expected to experience the same or similar reflection, and the LNA can be expected to receive the same or similar input power. As a result, the effect of multi-beams on the phase of the LNA is not expected to present a calibration issue.

It should be noted that although the phased array antenna 600 is depicted as having a set of antenna elements arranged on a square grid, in other embodiments, the set of antenna elements can be arranged in any other pattern suitable for beamforming and beam steering.

Figure 7:
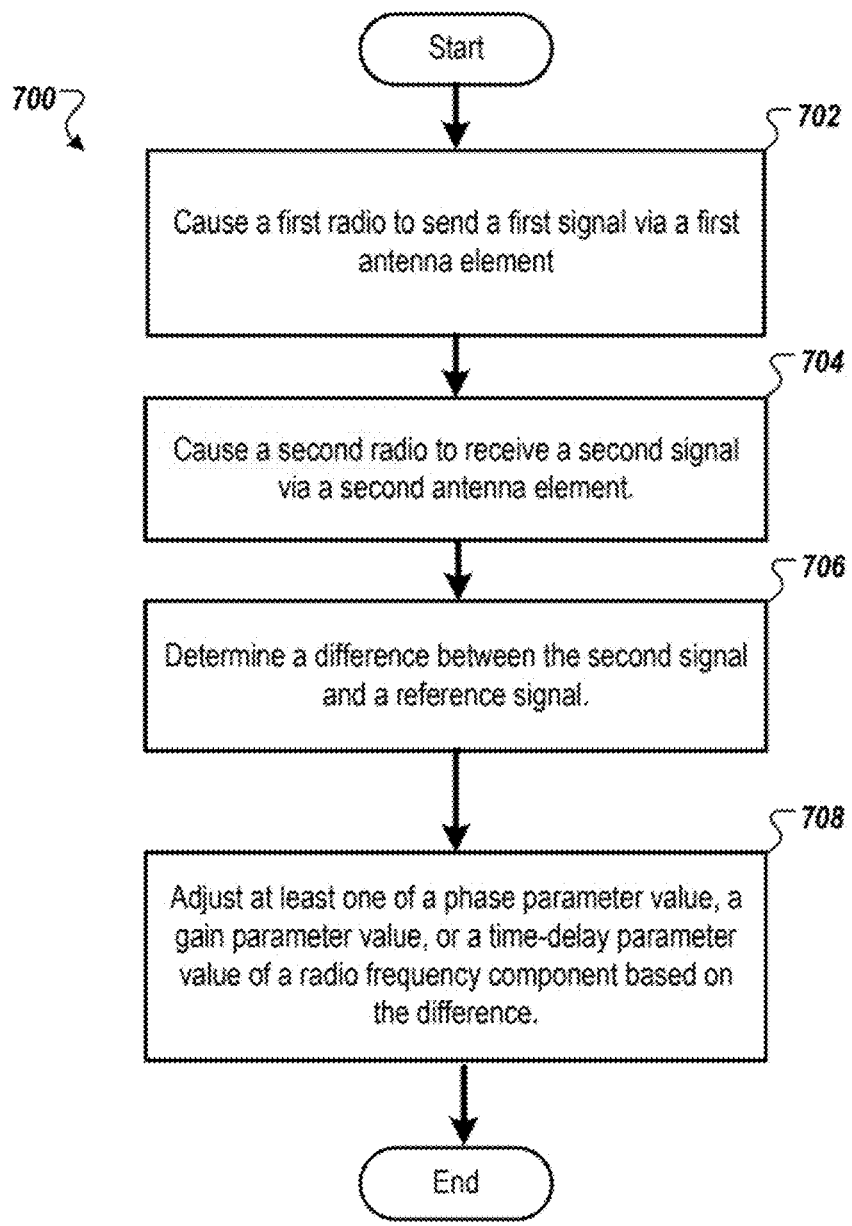
FIG. 7 is a flow diagram illustrating a method of calibrating a phased array antenna according to one embodiment.

FIG. 7 is a flow diagram illustrating a method 700 of calibrating a phased array antenna according to one embodiment. The method 700 may be performed by processing logic that comprises hardware (e.g., circuitry, dedicated logic, programmable logic, microcode, etc.), software, firmware, or a combination thereof. In one embodiment, the method 700 is performed by a processing device of a phased antenna described herein with respect to FIGS. 1-6.

Referring back to FIG. 7, the method 700 begins by the processing logic causing a first radio to send a first signal via a first antenna element disposed on a support structure (block 702). The first signal includes a set of tones. Each tone has a frequency within a fixed frequency range. The processing logic causes a second radio to receive a second signal via a second antenna element disposed on the support structure (block 704). The second signal is received at the second radio via a first signal path between a second antenna element of a set of antenna elements and the second radio. The second signal has a waveform that is responsive to the first signal. The processing logic determines a difference between the second signal and a reference signal (block 706). The difference includes at least one of an amplitude difference or a frequency difference between a first portion (e.g., a portion of a reference signal between a first frequency and a second frequency) of the reference waveform and a second portion (e.g., a portion of the second signal between a third frequency and a fourth frequency) of the second waveform, the second portion being a response to a first tone of the multi-tone waveform and the first portion being a response to the first tone. In some cases, a response to a tone of a multi-tone waveform can include a range of frequencies (e.g., from the first frequency to the second frequency or from the third frequency to the fourth frequency) due to dispersion or other effects. The processing logic adjusts at least one of a phase parameter value, a gain parameter value, or a time-delay parameter value of a radio frequency component based on the difference (block 708). For example, the gain parameter value can be adjusted based on determining that an amplitude of the second portion is different than an amplitude of the second portion. As another example, a phase parameter value can be adjusted based on determining that the first frequency is different than the third frequency and/or the second frequency is different than the fourth frequency. The method 700 ends.

In one embodiment, the second antenna element is part of an antenna array of the communication device and the first antenna element is embedded within a set of elements of a set of the antenna array. In another embodiment, the first antenna element is part of an antenna array of the communication device and the second antenna element is embedded within a set of elements of a set of the antenna array.

In a further embodiment, the set of tones includes a first subset of tones, and a second subset of tones. Each tone of the first subset of tones has a frequency that is less than a center frequency. Each tone of the first subset of tones has spacing between adjacent tones. Each tone of the second subset of tones has a frequency that is greater than the center frequency. Each tone of the second subset of tones is separated by the spacing. Further, each tone of the second subset of tones is a mirror image of each tone of the first subset of tones around the center frequency. Each tone of the second subset of tones is offset from the center frequency by less than the spacing.

In another further embodiment, the processing logic causes causing a third radio to receive a third signal via a third antenna element disposed on the support structure. The third signal has a second waveform that is responsive to the first signal. The processing logic determines a second difference between the second waveform of the third signal and a second reference waveform. The processing logic adjusts at least one of a second phase parameter value, a second gain parameter value, or a second time-delay parameter value of a second radio frequency component based on the second difference.

In another further embodiment, the processing logic causes a third radio to send a third signal via a third antenna element disposed on the support structure. The third signal has the set of tones. The processing logic causes the second radio to receive a fourth signal via the second antenna element disposed on the support structure. The fourth signal has a second waveform that is responsive to the third signal. The processing logic determines a second difference between the second waveform and a second reference waveform. The processing logic adjusts at least one of the phase parameter value, the gain parameter value, or the time-delay parameter value of the radio frequency component based on the second difference and the difference.

In another further embodiment, the processing logic causes the second radio to receive a first copy of a test signal via the second antenna element at a first time. The test signal is sent by an external element and includes a second set of tones. Each tone of the second set of tones has a frequency within a second fixed frequency range. The processing logic measures a first response waveform of a response of the second radio to receiving the first copy of the test signal. The processing logic causes a third radio to receive a second copy of the test signal via a third antenna element at a second time. The processing logic measures a second response waveform of a response of the third radio to receiving the test signal. The processing logic determines a second difference between the first response waveform and the second response waveform. The processing logic sets at least one of the phase parameter value, the gain parameter value, or the time-delay parameter value of the radio frequency component based on the second difference.

In a further embodiment, the processing logic stores a table in a memory device. The table stores a first set of fixed parameter offset values for a first operating condition and a second set of fixed parameter offsets for a second operating condition. The processing logic measures a value of a physical property of the phased array antenna. The value is indicative of the first operating condition. In one case, the processing logic determines that the value of the physical property is indicative of the first operating condition and the processing logic modifies at least one of the phase parameter value, the gain parameter value, or the time-delay parameter value by the first set of parameter offset values of the radio frequency component. In another case, the processing logic determines that the state of the radio frequency component is indicative of the second operating condition and the processing logic applies the second set of fix parameter offsets to the radio frequency component.

In another further embodiment, the processing logic causes the first radio to send the first signal that a first plurality of tones via the first antenna element. The processing logic measures the reference waveform of a response of the second radio to receiving the first signal. Finally, the processing logic stores the reference waveform in a memory device.

In a further embodiment, the processing logic stores a table in a memory device. The processing logic measures a parameter value of the radio frequency component. The processing logic determines that the parameter value is within a threshold range of parameter values stored in the table. Finally, the processing logic adjusts at least one of the phase parameter value, the gain parameter value, or the time-delay parameter value of the radio frequency component.

In a further embodiment, the processing logic causes the second radio to send a first beamforming signal via the second antenna element. The second antenna element is part of an antenna array. The processing logic causes a set of radios to send a set of beamforming signals via a set of antenna elements of the antenna array, wherein the first beamforming signal and the set of beamforming signals are to interfere to produce a directed beam of electromagnetic radiation.

In one embodiment, a phased array antenna includes both a receiving array and a transmitting array. Antenna probes can be embedded as described herein for calibration. An antenna probe can function both as a transmitter and a receiver. In one embodiment, a phased array antenna includes at least a first radio coupled to a first antenna element, a second radio coupled to a second antenna element, and a processor coupled to the first radio and the second radio. The phased array antenna can further include at least first embedded antenna probe coupled to a third radio. The processor can further be coupled to the third radio. In some cases the phased antenna can include additional antenna elements, radios, and embedded probes.

Figure 8:
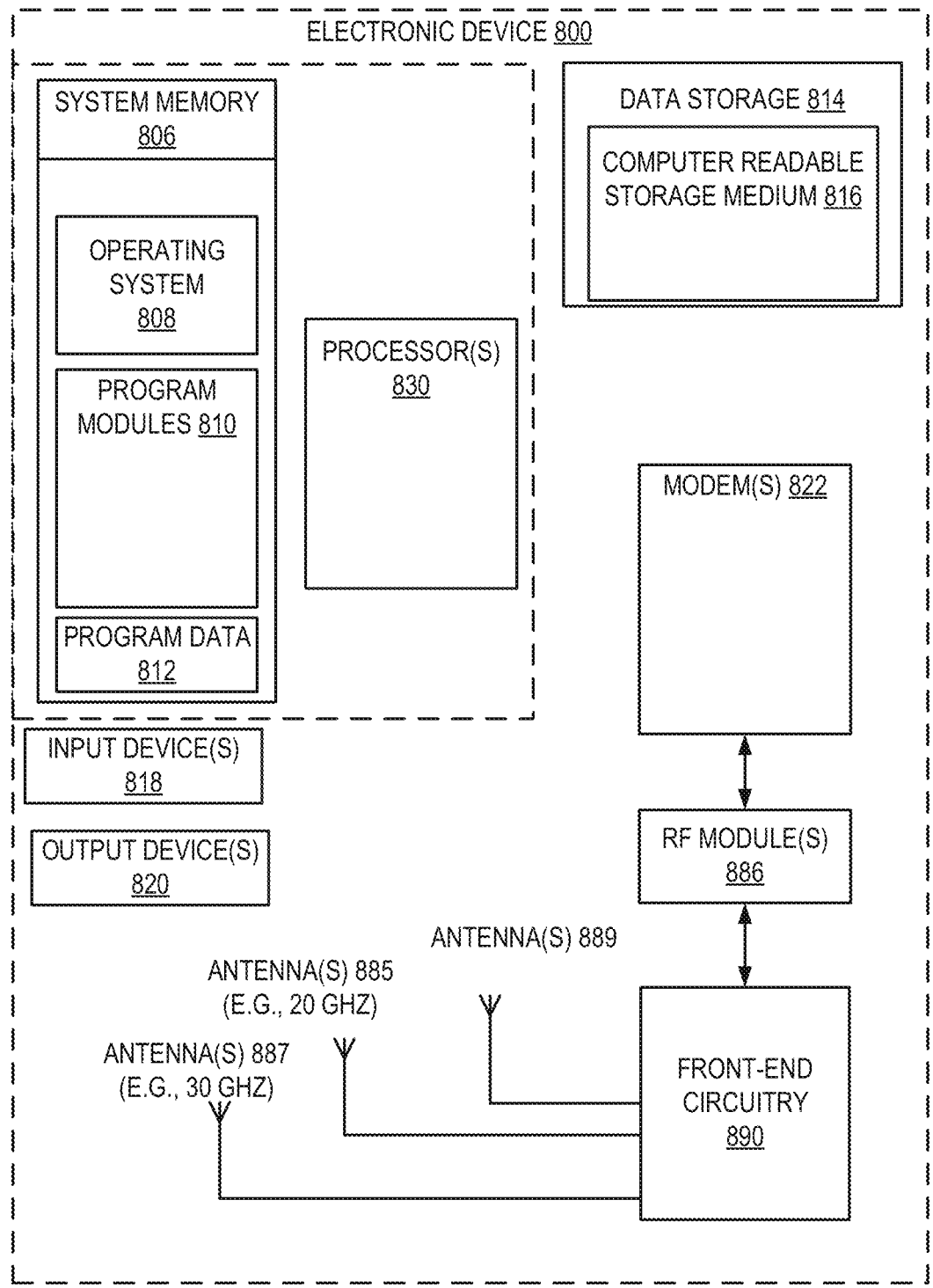
FIG. 8 is a block diagram of an electronic device that can be calibrated via a one-time calibration, an open-loop calibration, and a closed-loop calibration as described herein according to one embodiment.

FIG. 8 is a block diagram of an electronic device 800 that can be calibrated via a one-time calibration, an open-loop calibration, and a closed-loop calibration as described herein according to one embodiment. In one embodiment, the electronic device 800 includes the RX chain 100 of FIG. 1. In another embodiment, the electronic device 800 includes the antenna elements 204 of FIG. 2. In another embodiment, the electronic device 800 includes the calibration probes 402 and the antenna elements 404 of FIG. 4. In another embodiment, the electronic device 800 includes transmitter chain 510 of FIG. 5. In another embodiment, the electronic device 800 includes the calibration probes and the antenna elements 604 of FIG. 6. Alternatively, the electronic device 800 may be other electronic devices, as described herein.

The electronic device 800 includes one or more processor(s) 830, such as one or more CPUs, microcontrollers, field programmable gate arrays, or other types of processors. The electronic device 800 also includes system memory 806, which may correspond to any combination of volatile and/or non-volatile storage mechanisms. The system memory 806 stores information that provides operating system component 808, various program modules 810, program data 812, and/or other components. In one embodiment, the system memory 806 stores instructions of methods to control operation of the electronic device 800. The electronic device 800 performs functions by using the processor(s) 830 to execute instructions provided by the system memory 806.

The electronic device 800 also includes a data storage device 814 that may be composed of one or more types of removable storage and/or one or more types of non-removable storage. The data storage device 814 includes a computer-readable storage medium 816 on which is stored one or more sets of instructions embodying any of the methodologies or functions described herein. Instructions for the program modules 810 may reside, completely or at least partially, within the computer-readable storage medium 816, system memory 806 and/or within the processor(s) 830 during execution thereof by the electronic device 800, the system memory 806, and the processor(s) 830 also constituting computer-readable media. The electronic device 800 may also include one or more input devices 818 (keyboard, mouse device, specialized selection keys, etc.) and one or more output devices 820 (displays, printers, audio output mechanisms, etc.).

The electronic device 800 further includes a modem 822 to allow the electronic device 800 to communicate via a wireless connections (e.g., such as provided by the wireless communication system) with other computing devices, such as remote computers, an item providing system, and so forth. The modem 822 can be connected to one or more radio frequency (RF) modules 886. The RF modules 886 may be a wireless local area network (WLAN) module, a wide area network (WAN) module, wireless personal area network (WPAN) module, Global Positioning System (GPS) module, or the like. The antenna structures (antenna(s) 885, 887, 889) are coupled to the front-end circuitry 890, which is coupled to the modem 822. The front-end circuitry 890 may include radio front-end circuitry, antenna switching circuitry, impedance matching circuitry, or the like. The antennas 885, 887, 889 may be GPS antennas, Near-Field Communication (NFC) antennas, other WAN antennas, WLAN or PAN antennas, or the like. The modem 822 allows the electronic device 800 to handle both voice and non-voice communications (such as communications for text messages, multimedia messages, media downloads, web browsing, etc.) with a wireless communication system. The modem 822 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1×RTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 822 may generate signals and send these signals to antenna(s) 885, 887, 889 of a first type (e.g., 20 GHz), antenna(s) 885 of a second type (e.g., 30 GHz), and/or antenna(s) 887 of a third type (e.g., WAN, WLAN, PAN, or the like), via front-end circuitry 890, and RF module(s) 886 as descried herein. Antennas 885, 887, 889 may be configured to transmit in different frequency bands and/or using different wireless communication protocols. The antennas 885, 887, 889 may be directional, omnidirectional, or non-directional antennas. In addition to sending data, antennas 885, 887, 889 may also receive data, which is sent to appropriate RF modules connected to the antennas. One of the antennas 885, 887, 889 may be any combination of the antenna structures described herein.

In one embodiment, the electronic device 800 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 822 is shown to control transmission and reception via antenna (885, 887, 889), the electronic device 800 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "causing," "determining," "adjusting," "measuring," setting," "storing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A communication device for a satellite, the communication device comprising:
    a phased array antenna comprising a plurality of elements, each element being disposed on a surface of a support structure of the communication device;
    a probe element located on the surface of the support structure between two or more of the plurality of elements;
    a first radio coupled to the phased array antenna, the first radio comprising at least one radio frequency front-end (RFFE) component having a phase parameter value, a gain parameter value, and a time-delay parameter value that are adjustable for calibrating at least one of a phase, a gain, or a time-delay of a signal path between the first radio and at least one of the plurality of elements;

a second radio coupled to the probe element, the second radio generating and sending a first signal via the probe element, the first signal comprising a multi-tone waveform, wherein the multi-tone waveform covers a fixed bandwidth and comprises a plurality of tones, each tone occupying a certain non-overlapping frequency range within the fixed bandwidth;

a memory device that stores a reference waveform; and a processor coupled to the memory device, the first radio, and the second radio, wherein the processor:

measures a second waveform of a second signal received at the first radio, the second signal being received in response to the first signal being sent by the second radio, the second waveform representing a frequency response of the second signal;

determines a difference between the second waveform and the reference waveform, wherein the difference comprises at least one of an amplitude difference or a frequency difference between a first portion of the reference waveform and a second portion of the second waveform, the second portion being a response to a first tone of the multi-tone waveform and the first portion being a response to the first tone; and adjusts the gain parameter value responsive to determining that an amplitude of the second portion is different than an amplitude of the first portion.

2. The communication device of claim 1, wherein:

the second signal is received at the first radio via a first signal path between a first element of the plurality of elements and the first radio;

the first radio further comprises a second RFFE component having a second phase parameter value, a second gain parameter value, and a second time-delay parameter value that are adjustable for calibrating at least one of a phase, a gain, or a time-delay of a second signal path between a second element of the plurality of elements and the first radio;

the processor measures a third waveform of a third signal received at the first radio, the third signal being received in response to the first signal being sent by the second radio;

the processor determines a second difference between the third waveform and the reference waveform; and the processor adjusts at least one of the second phase parameter value, the second gain parameter value, or the second time-delay parameter value based on the second difference.

3. The communication device of claim 1, wherein the multi-tone waveform comprises:

a first subset of tones, each having a frequency that is less than a center frequency and with a spacing between each tone of the first subset being less than 25 MHz; and a second subset of tones, each having a frequency that is greater than the center frequency, wherein each tone of the second subset of tones is a mirror image of a corresponding tone of the first subset of tones around the center frequency and each tone of the second subset is offset by less than the spacing in order to determine an in-phase/quadrature (IQ) imbalance.

4. A method of operating a communication device of a satellite, the method comprising:

causing, by a processing device, a first radio to send a first signal via a first antenna element disposed on a support structure of the communication device, the first signal comprising a plurality of tones, each tone of the plurality of tones having a frequency within a fixed frequency range;

causing, by the processing device, a second radio to receive a second signal via a second antenna element disposed on the support structure, the second signal being responsive to the first signal, wherein the second antenna element is located between two or more antenna elements of an antenna array;

determining, by the processing device, a difference between the second signal and a reference signal; and adjusting, by the processing device, at least one of a phase parameter value, a gain parameter value, or a time-delay parameter value of a radio frequency component based on the difference.

5. The method of claim 4, wherein the second antenna element is part of the antenna array of the communication device and the first antenna element is located adjacent to a subset of the antenna array, and wherein the radio frequency component is coupled to the second antenna element and is part of a receiver chain.

6. The method of claim 4, wherein the first antenna element is part of the antenna array of the communication device and the second antenna element is located adjacent to a subset of the antenna array, and wherein the radio frequency component is coupled to the first antenna element and is part of a transmitter chain.

7. The method of claim 4, wherein the plurality of tones comprises:

a first subset of tones, each having a frequency that is less than a center frequency and with a spacing between each tone of the first subset of tones; and a second subset of tones, each having a frequency that is greater than the center frequency and with the spacing between each tone of the second subset of tones.

8. The method of claim 7, wherein each tone of the second subset of tones is a mirror image of each tone of the first subset of tones around a center frequency and each tone of the second subset is offset by less than the spacing.

9. The method of claim 4, further comprising:

causing, by the processing device, a third radio to receive a third signal via a third antenna element disposed on the support structure, the third signal being responsive to the first signal;

determining, by the processing device, a second difference between the third signal and a second reference signal; and adjusting at least one of a second phase parameter value, a second gain parameter value, or a second time-delay parameter value of a second radio frequency component based on the second difference.

10. The method of claim 4, further comprising:

causing, by the processing device, a third radio to send a third signal via a third antenna element disposed on the support structure, the third signal comprising the plurality of tones;

causing, by the processing device, the second radio to receive a fourth signal via the second antenna element disposed on the support structure, the fourth signal being responsive to the third signal;

determining, by the processing device, a second difference between the fourth signal and a second reference signal; and adjusting, by the processing device, at least one of the phase parameter value, the gain parameter value, or the time-delay parameter value of the radio frequency component based on the second difference and the difference.

11. The method of claim 4, further comprising:
causing, by the processing device, the second radio to receive a test signal via the second antenna element at a first time, the test signal being sent by an external element and comprising a second plurality of tones, each having a frequency within a second fixed frequency range;
measuring, by the processing device, a first response signal of the test signal being received at the second radio at the first time;
causing, by the processing device, a third radio to receive the test signal via a third antenna element at a second time, the test signal being sent by the external element at the second time;
measuring, by the processing device, a second response signal of the test signal being received at the third radio at the second time;
determining, by the processing device, a second difference between the first response signal and the second response signal; and
setting, by the processing device, at least one of the phase parameter value, the gain parameter value, or the time-delay parameter value of the radio frequency component based on the second difference.

12. The method of claim 4, further comprising:
after calibration of the radio frequency component by a test signal being sent by an external element at a first time,
causing, by the processing device, the first radio to send the first signal at a second time that is after the first time, the first signal comprising the plurality of tones via the first antenna element;
measuring, by the processing device, the reference signal responsive to the first signal being received at the second radio at the second time; and
storing, by the processing device, the reference signal in a memory device.

13. The method of claim 4, further comprising:
storing, by the processing device, a table in a memory device, wherein the table stores a first set of parameter offset values for a first operating condition of the communication device and a second set of parameter offset values for a second operating condition of the communication device;
measuring, by the processing device, a value of a physical property of the communication device, the value being indicative of the first operating condition; and
modifying the at least one of the phase parameter value, the gain parameter value, or the time-delay parameter value by the first set of parameter offset values of the radio frequency component.

14. An apparatus comprising:
a first radio coupled to a first antenna element;
a second radio coupled to a second antenna element; and
a processor coupled to the first radio and the second radio, wherein the processor is configured to:
cause the first radio to send a first signal via the first antenna element, the first signal comprising a plurality of frequencies, each frequency of the plurality of frequencies being within a fixed frequency range;
cause the second radio to receive a second signal via the second antenna element, the second signal being responsive to the first signal, wherein the second antenna element is located between two or more antenna elements of an antenna array;
determine a difference between the second signal and a reference signal; and
adjust at least one of a phase parameter value, a gain parameter value, or a time-delay parameter value of a radio frequency component based on the difference.

15. The apparatus of claim 14, wherein the second antenna element is part of the antenna array of a phased array antenna of a satellite and the first antenna element is located adjacent to a subset of the antenna array, and wherein the radio frequency component is coupled to the first antenna element and is part of a transmitter chain.

16. The apparatus of claim 14, wherein the first antenna element is part of the antenna array of a phased array antenna of a satellite and the second antenna element is located adjacent to a subset of the antenna array, and wherein the radio frequency component is coupled to the first antenna element and is part of a transmitter chain.

17. The apparatus of claim 14, wherein the plurality of frequencies comprises:
a first subset of frequencies, each being less than a carrier frequency and with a separation between each frequency of the first subset of frequencies; and
a second subset of frequencies, each having a frequency that is greater than the carrier frequency and with the separation between each frequency of the second subset of frequencies.

18. The apparatus of claim 17, wherein each frequency of the second subset of frequencies is a mirror image of each frequency of the first subset of frequencies around a center frequency that is offset from the carrier frequency by less than the separation.

19. The apparatus of claim 14, further comprising:
a third radio coupled to a third antenna element, wherein the processor is further configured to:
cause the third radio to receive a third signal via the third antenna element disposed on a support structure of the apparatus, the third signal being responsive to the first signal;
determine a second difference between the third signal and a second reference signal; and
adjust at least one of a second phase parameter value, a second gain parameter value, or a second time-delay parameter value of a second radio frequency component based on the second difference.

20. The apparatus of claim 14, further comprising:
a memory device, coupled to the processor, to store a table, wherein the table stores a first set of parameter offset values for a first operating condition of a phased array antenna and a second set of parameter offset values for a second operating condition of the phased array antenna; and
a sensor coupled to the processor, wherein the processor is further configured to:
measure a value of a physical property of the phased array antenna using the sensor, the value being indicative of the first operating condition; and
modify the at least one of the phased parameter value, the gain parameter value, or the time-delay parameter value by the first set of parameter offset values of the radio frequency component.

* * * * *